(12) United States Patent
Hatano et al.

(10) Patent No.: US 10,391,694 B2
(45) Date of Patent: Aug. 27, 2019

(54) METHOD OF PRODUCING FILM

(71) Applicant: Kaneka Corporation, Osaka (JP)

(72) Inventors: Keisuke Hatano, Osaka (JP); Yutaka Fujiwara, Osaka (JP)

(73) Assignee: KANEKA CORPORATION, Osaka (JP)

( * ) Notice: Subject to any disclaimer, the term of this patent is extended or adjusted under 35 U.S.C. 154(b) by 451 days.

(21) Appl. No.: 15/108,136

(22) PCT Filed: Dec. 22, 2014

(86) PCT No.: PCT/JP2014/006406
§ 371 (c)(1),
(2) Date: Jun. 24, 2016

(87) PCT Pub. No.: WO2015/098096
PCT Pub. Date: Jul. 2, 2015

(65) Prior Publication Data
US 2016/0325477 A1 Nov. 10, 2016

(30) Foreign Application Priority Data
Dec. 25, 2013 (JP) .................................. 2013-266466

(51) Int. Cl.
| | |
|---|---|
| B29D 11/00 | (2006.01) |
| B29C 47/14 | (2006.01) |
| B29C 48/30 | (2019.01) |
| B29C 48/305 | (2019.01) |
| B29C 48/08 | (2019.01) |
| B29C 48/00 | (2019.01) |
| C08J 5/18 | (2006.01) |
| B29K 21/00 | (2006.01) |
| B29K 101/12 | (2006.01) |
| B29K 105/16 | (2006.01) |
| B29L 7/00 | (2006.01) |
| B29L 11/00 | (2006.01) |
| B29K 421/00 | (2006.01) |

(52) U.S. Cl.
CPC ............ B29C 48/30 (2019.02); B29C 48/022 (2019.02); B29C 48/08 (2019.02); B29C 48/305 (2019.02); B29D 11/00788 (2013.01); C08J 5/18 (2013.01); *B29K 2021/003* (2013.01); *B29K 2101/12* (2013.01); *B29K 2105/16* (2013.01); *B29K 2421/00* (2013.01); *B29K 2995/0026* (2013.01); *B29L 2007/008* (2013.01); *B29L 2011/00* (2013.01); *C08J 2333/12* (2013.01); *C08J 2333/14* (2013.01); *C08J 2351/00* (2013.01); *C08J 2351/04* (2013.01); *C08J 2351/06* (2013.01); *C08J 2419/00* (2013.01); *C08J 2433/12* (2013.01); *C08J 2433/14* (2013.01); *C08J 2451/00* (2013.01); *C08J 2451/04* (2013.01); *C08J 2451/06* (2013.01)

(58) Field of Classification Search
CPC . B29C 47/14; B29C 47/0004; B29C 47/0021; B29C 48/30; B29C 48/305; B29C 48/08; B29C 48/022; B29D 11/00788; C08J 5/18
See application file for complete search history.

(56) References Cited

U.S. PATENT DOCUMENTS

2011/0097561 A1* 4/2011 Kang .................... C08J 5/18
428/212

FOREIGN PATENT DOCUMENTS

| | | | |
|---|---|---|---|
| JP | 10-306171 | * | 11/1998 |
| JP | H10306171 A | | 11/1998 |
| JP | 2009255453 A | | 11/2009 |
| JP | 2009292871 A | | 12/2009 |
| JP | 2011168059 A | | 9/2011 |
| WO | 2012/114718 A1 | | 8/2012 |

OTHER PUBLICATIONS

International Preliminary Report on Patentability with Written Opinion issued in corresponding International Application No. PCT/JP2014/006406 dated Jun. 28, 2016 (5 pages).
International Search Report issued in corresponding International Application No. PCT/JP2014/006406 dated Mar. 24, 2015 (2 pages).
Office Action issued in corresponding Japanese Patent Application No. 2015-554564; dated Sep. 11, 2018 (9 pages).
Office Action issued in corresponding Japanese Patent Application No. 2015-554564, dated Apr. 2, 2019 (7 pages).

* cited by examiner

*Primary Examiner* — Mathieu D Vargot
(74) *Attorney, Agent, or Firm* — Osha Liang LLP

(57) ABSTRACT

Disclosed herein is a method of producing a film, the method being capable of suppressing formation of die lines in melt extrusion molding using a T die. A thermoplastic resin composition having a relaxation modulus of not less than 100 Pa and not more than 2,000 Pa is melted and kneaded, the relaxation modulus being measured under conditions of a temperature of 260° C., distortion of 1%, and a relaxation time of 1 second, and extrusion molding of the thermoplastic resin composition using the T die is performed to form the film. The thermoplastic resin composition may contain an acrylic resin and a rubber particle.

8 Claims, No Drawings

METHOD OF PRODUCING FILM

TECHNICAL FIELD

The present invention relates to a method of producing a film.

BACKGROUND

Acrylic resin is excellent in transparency, and a system (core-shell type rubber, for example) to which acrylic rubber is added is excellent in processability, so that acrylic resin is widely used as films, sheets, and general molded articles.

Widely used in recent years as a method of decorating a surface layer of a resin molded article instead of paining are: a transfer method in which an acrylic resin film (hereinafter referred to as a "decorative laminated film") decorated by printing or the like is inserted in an injection molding mold, injection molding is performed, only a decorative layer is transferred to the surface of a molded article, and the film is peeled off; a method, such as an insert molding method or an in-mold molding method, of performing decoration simultaneously with injection molding, that is, forming a decorative film on a molded article as an outermost surface of the molded article; and a method of laminating a film on the surface of an injection molding article. According to these molding methods, an excellent design and high-class feeling that are specific to the acrylic resin can be given to the molded article.

Further, light transmissive acrylic resin is widely used as a material constituting a film-shaped or plate-shaped optical member (such as a film, a substrate, or a prism sheet used in a liquid crystal display device) used in various optical related devices. Such resin is generally called "optical resin" or "optical polymer", and a film made of such resin is called an "optical film."

If the decorative laminated film or the optical film is used for interior and exterior materials of vehicles such as cars or for liquid crystal display devices such as personal computers and liquid crystal TVs, and extrusion molding by a T die method using a flat die is performed as a method of molding an acrylic resin film, a line-like defect called a die line continuously formed in a flow direction of the film. Thus, appearance design may deteriorate, and when the film is incorporated in the liquid crystal display device, display failures may be caused in practical use.

It is generally said that the die line is formed when a minute break, called a crack, or a chip is formed at a land portion or lip portion of a die or when resin, a decomposition product of resin, or the like sticks to the land portion or the lip portion to scratch molten resin.

These significantly limit the use of the acrylic resin film.

PTL 1 describes that: an adhered substance called gum becomes a cause of the formation of the die line in the extrusion molding using a T die; and to avoid the formation of the die line, a pull-down angle is adjusted.

Known as one of properties of the molten resin is a relaxation modulus. The relaxation modulus is a physical property that indicates the ease of disappearance of the deformation of the molten resin.

PTL 2 describes that by controlling the relaxation modulus of polypropylene-based resin, the viscosity of the resin in foam molding is improved, and therefore, a cell wall can be maintained. However, PTL 2 does not describe anything about the extrusion molding using the T die and does not describe the correlation between the relaxation modulus and the die line.

CITATION LIST

Patent Literature

PTL 1: Japanese Laid-Open Patent Application Publication No. 2011-168059

PTL 2: Japanese Laid-Open Patent Application Publication No. 10-306171

SUMMARY OF INVENTION

Although PTL 1 describes a method of avoiding the formation of the die line, an improvement effect only by the adjustment of the pull-down angle is inadequate.

One or more embodiments of the present invention provide a method of producing a film, the method being capable of suppressing formation of a die line in melt extrusion molding using a T die.

The present inventors have thought that the die line is formed in the process of producing the film by the melt extrusion method when molten resin is deformed (distorted) by the crack at the land portion or lip portion of the die, and the molten resin is cooled and solidified without relaxation (disappearance) of this deformation (distortion).

The molten resin deforms by stress. However, depending on the resin composition of a system, such deformation of the system easily disappears. In this system, a phenomenon called relaxation easily occurs. The ease of relaxation can be quantified by measuring and comparing a property called the relaxation modulus.

As above, the present inventors have considered that whether or not the die line is easily formed is correlated to the relaxation modulus of the molten resin.

The present inventors have diligently studied based on this consideration. As a result, the present inventors have found that the formation of the die line is suppressed by using a thermoplastic resin composition having a specific relaxation modulus when producing an acrylic resin film by melt extrusion molding using a T die.

To be specific, one or more embodiments of the present invention relate to a method of producing a film, the method including: melting and kneading a thermoplastic resin composition having a relaxation modulus of not less than 100 Pa and not more than 2,000 Pa, the relaxation modulus being measured under conditions of a temperature of 260° C., distortion of 1%, and a relaxation time of 1 second; and performing extrusion molding of the thermoplastic resin composition using a T die to form the film.

Preferably, the thermoplastic resin composition contains an acrylic resin and a rubber particle.

Preferably, the thermoplastic resin composition contains at least one selected from the group consisting of: a maleimide acrylic resin; a glutarimide acrylic resin; a lactone ring-containing acrylic polymer; a partially-hydrogenated styrene-containing acrylic polymer obtained by partial hydrogenation of an aromatic ring of a styrene-containing acrylic polymer obtained by polymerization of a styrene monomer and another monomer copolymerizable with the styrene monomer; an acrylic polymer containing a cyclic acid anhydride repeating unit; and an acrylic polymer containing a hydroxyl group and/or a carboxyl group.

Preferably, the thermoplastic resin composition contains a maleimide acrylic resin having a maleimide unit represented by a general formula (5) below and a (meth)acrylic ester unit,

[Chemical Formula 1]

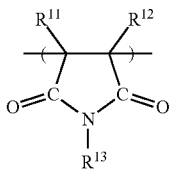

(5)

wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from group A below, group A: halogen atom, hydroxyl group, nitro group, alkoxy group having 1 to 12 carbon atoms, alkyl group having 1 to 12 carbon atoms, and arylalkyl group having 7 to 14 carbon atoms.

Preferably, the maleimide acrylic resin further contains a unit represented by a general formula (3) below,

[Chemical Formula 2]

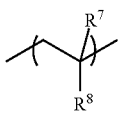

(3)

wherein $R^7$ is hydrogen or an alkyl group having 1 to 8 carbon atoms and $R^8$ is an aryl group having 6 to 10 carbon atoms.

Preferably, the thermoplastic resin composition contains a glutarimide acrylic resin having a unit represented by a general formula (1) below and a unit represented by a general formula (2) below,

[Chemical Formula 3]

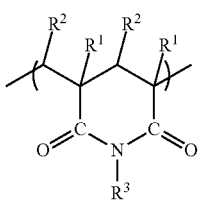

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent group having 5 to 15 carbon atoms,

[Chemical Formula 4]

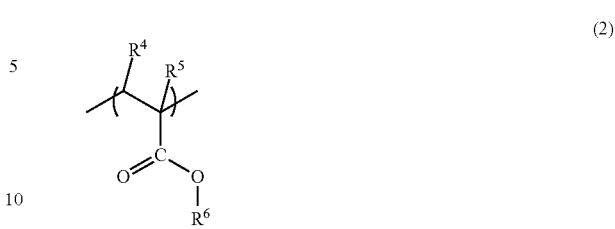

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent group having 5 to 15 carbon atoms.

Preferably, the film is an optical film.

One or more embodiments of the present invention also relate to a thermoplastic resin composition having a relaxation modulus of not less than 100 Pa and not more than 2,000 Pa, the relaxation modulus being measured under conditions of a temperature of 260° C., distortion of 1%, and a relaxation time of 1 second.

An orientation birefringence of the thermoplastic resin composition is preferably $-1.7 \times 10^{-4}$ to $1.7 \times 10^{-4}$. Further, a photoelastic constant of the thermoplastic resin composition is preferably $-4 \times 10^{-12}$ to $4 \times 10^{-12}$ Pa$^{-1}$.

The thermoplastic resin composition preferably contains a thermoplastic resin and a cross-linked structure-containing polymer. Further, more preferably, a photoelastic constant of the thermoplastic resin is opposite in sign to a photoelastic constant of the cross-linked structure-containing polymer.

Preferably, the thermoplastic resin composition contains an acrylic resin and a rubber particle.

Preferably, the thermoplastic resin composition contains at least one selected from the group consisting of: a maleimide acrylic resin; a glutarimide acrylic resin; a lactone ring-containing acrylic polymer; a partially-hydrogenated styrene-containing acrylic polymer obtained by partial hydrogenation of an aromatic ring of a styrene-containing acrylic polymer obtained by polymerization of a styrene monomer and another monomer copolymerizable with the styrene monomer; an acrylic polymer containing a cyclic acid anhydride repeating unit; and an acrylic polymer containing a hydroxyl group and/or a carboxyl group.

Preferably, the thermoplastic resin composition contains a maleimide acrylic resin having a maleimide unit represented by a general formula (5) below and a (meth)acrylic ester unit,

[Chemical Formula 5]

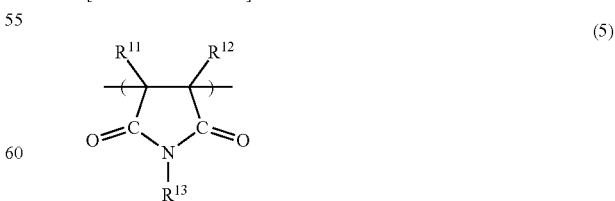

(5)

wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from group A below, group A: halogen atom, hydroxyl group, nitro group, alkoxy group having 1 to 12 carbon atoms, alkyl group having 1 to 12 carbon atoms, and arylalkyl group having 7 to 14 carbon atoms.

Preferably, the maleimide acrylic resin further contains a unit represented by a general formula (3) below,

[Chemical Formula 6]

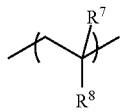

(3)

wherein $R^7$ is hydrogen or an alkyl group having 1 to 8 carbon atoms and $R^8$ is an aryl group having 6 to 10 carbon atoms.

Preferably, the thermoplastic resin composition contains a glutarimide acrylic resin having a unit represented by a general formula (1) below and a unit represented by a general formula (2) below,

[Chemical Formula 7]

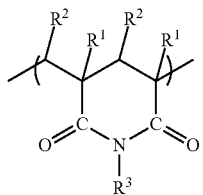

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent group having 5 to 15 carbon atoms,

[Chemical Formula 8]

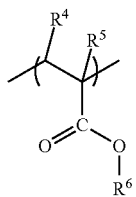

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent group having 5 to 15 carbon atoms.

Preferably, the cross-linked structure-containing polymer is a multi-layered particle including a hard polymer layer containing, as a structural unit, a vinyl-based monomer having an alicyclic structure, a heterocyclic structure, or an aromatic group.

Preferably, the thermoplastic resin composition is a thermoplastic resin composition for film molding, and more preferably, the film is an optical film.

Further, one or more embodiments of the present invention is a molded body or film made of the thermoplastic resin composition.

According to one or more embodiments of the present invention, the formation of the die lines is suppressed by melt extrusion molding using a T die, and as a result, a film which is extremely small in the number of die lines can be produced. The film produced by one or more embodiments of the present invention is extremely small in the number of die lines, is excellent in appearance design, does not have defects (such as line-like defects) caused by the die line when the film is incorporated in the liquid crystal display device in practical use, and is suitably used in various applications such as optical applications.

DESCRIPTION OF EMBODIMENTS

Hereinafter, one or more embodiments of a production method of the present invention will be explained in detail.

According to one or more embodiments of the production method of the present invention, a film is produced in such a manner that a thermoplastic resin composition is melted and kneaded and is then subjected to extrusion molding using a T die. Specifically, first, the thermoplastic resin composition that is a material of the film is put into an extruder and is heated in the extruder to a temperature that is not less than a glass transition temperature of the thermoplastic resin composition. Thus, the thermoplastic resin composition becomes a molten state. The thermoplastic resin composition in the molten state is moved to the T die attached to an exit side of the extruder and is ejected from a T die exit at a die tip end. At the time of this ejection, the thermoplastic resin composition in the molten state becomes a sheet shape by the shape of the die exit.

It is preferable that surfaces of the sheet-shaped thermoplastic resin composition in the molten state be smoothed by sandwiching the composition between a pair of smoothing rolls. By sandwiching the thermoplastic resin composition between the pair of smoothing rolls and taking out the thermoplastic resin composition, the thermoplastic resin composition is cooled to a temperature not more than the glass transition temperature to be solidified. Thus, the film is produced.

The relaxation modulus of the thermoplastic resin composition used in one or more embodiments of the present invention is measured under conditions of a heating temperature of 260° C., distortion of 1%, and a relaxation time of 1 second and is preferably not less than 100 Pa and not more than 2,000 Pa, more preferably not less than 200 Pa and not more than 1,500 Pa. When the relaxation modulus of the thermoplastic resin composition is not less than 100 Pa, the number of die lines is extremely small, and the strength (cracking resistance) of the film is preferable. When the relaxation modulus is not more than 2,000 Pa, the formation of the die line is suppressed, which is preferable.

The relaxation modulus of the present specification is a value calculated by the following operations. To be specific, the relaxation modulus of the present specification is a value measured by using a dynamic viscoelasticity measuring device ARES (produced by TA instruments) under conditions of a set temperature of 260° C., a φ25 mm cone plate, and distortion of 1%. The relaxation modulus of the present application is measured one second after the start of the relaxation after the application of the distortion.

A method of controlling the relaxation modulus of the thermoplastic resin composition is not especially limited, and examples thereof are as below. The relaxation modulus can be reduced by increasing the rate of a component that is contained in the thermoplastic resin composition and easily relaxed. To be specific, the relaxation modulus can be reduced by reducing the molecular weight of the resin or the glass transition temperature.

Especially in a system in which the thermoplastic resin composition contains acrylic resin and rubber particles to improve processability such as cracking resistance, trimming resistance, and tensile elongation rate, rubber itself is a component that is less likely to be relaxed. Therefore, the die line is easily formed. However, by reducing the amount of rubber blended, the relaxation modulus of the entire thermoplastic resin composition can be suppressed.

Regarding the rubber particles blended, by reducing the amount of crosslinking agent used at the time of production, the relaxation modulus of the entire thermoplastic resin composition can be suppressed.

When the rubber particles are so-called core-shell type rubber particles that intend to be uniformly dispersed in matrix resin, and the amount of graft component (graft polymer) copolymerized with a core portion that is rubber is small, the elasticity of the rubber is less likely to be reflected on the entire thermoplastic resin composition. Thus, the relaxation modulus can be suppressed.

Examples of the T die used in one or more embodiments of the present invention include a manifold die, a fish-tail die, and a coat hanger die. Among these, the coat hanger die and the manifold die are preferable.

Regarding a width of the T die, the T die suitable for a desired film width can be used. One or more embodiments of the present invention are applicable to a method of producing a film using T dies of various widths.

One example of a material of the T die is chromium molybdenum steel, and one example of channel surface finish is HCr (hard chromium) finish. Among them, it is preferable to use the T die having the lip portion subjected to a high-precision surface treatment by ceramic thermal spraying. This is because the formation of the die line and the like is prevented, and the film having few defects can be produced.

Conditions for melting the thermoplastic resin composition in the extruder in one or more embodiments of the present invention are not especially limited and can be determined depending on the resin. For example, it is preferable to set a cylinder temperature such that the temperature of the resin at the exit of the extruder becomes 220 to 280° C. It is more preferable that the temperature of the resin at the exit of the extruder become 240 to 270° C.

Various extruders can be used as the extruder of the present invention, and examples thereof include a single-screw extruder, a co-rotating intermeshing twin-screw extruder, a co-rotating non-intermeshing twin-screw extruder, a counter-rotating intermeshing twin-screw extruder, a counter-rotating non-intermeshing twin-screw extruder, and a multi-screw extruder. Among them, the single-screw extruder is preferable. This is because: since a resin staying part is small in the extruder, heat deterioration of the resin during extrusion can be prevented; and the equipment cost is low. Further, it is preferable to use the extruder including a vent mechanism for removing residual volatile matters in the resin and heating generating matters in the extruder. It is preferable that the size (diameter) of the extruder be selected in accordance with a desired ejection amount.

Further, to uniformize the ejection amount and the thickness of the film, it is preferable to use a gear pump. It is preferable to use a control method in which: the number of rotations of the gear pump and the pressure before flowing into the gear pump are uniformized; and depending on these, the number of rotations of the extruder is determined.

The thermoplastic resin composition that can be used in one or more embodiments of the present invention is not especially limited as long as it can be used as a film, especially an optical film and can be molded by melt extrusion.

In one or more embodiments of the present invention, a resin generally having transparency can be used as the thermoplastic resin. Specific examples of the resin include a wide variety of transparent thermoplastic resins such as polycarbonate resins typified by bisphenol A polycarbonate; aromatic vinyl-based resins and hydrogenated products thereof such as polystyrene, styrene-acrylonitrile copolymers, styrene-maleic anhydride resins, styrene-maleimide resins, styrene-(meth)acrylic acid resins, and styrene-based thermoplastic elastomers; polyolefin-based resins such as amorphous polyolefins, transparent polyolefins with a microcrystalline phase, and ethylene-methyl methacrylate resins; acrylic resins such as polymethylmethacrylate and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase such as polyethylene terephthalate or polyethylene terephthalate partially denatured with a cyclohexanedimethylene group or isophthalic acid, polyethylene naphthalate, and polyarylate; polyimide resins; polyethersulfone resins; polyamide resins; cellulose-based resins such as triacetylcellulose resins; and polyphenylene oxide resins. In consideration of practical use, the thermoplastic resin is preferably selected so that a molded body (3 mm in thickness) made of the thermoplastic resin has a total light transmittance of 85% or higher, preferably 90% or higher, more preferably 92% or higher. Specifically, it is preferable to select such thermoplastic resin that the total light transmittance of the molded body made of the thermoplastic resin and having 3 mm in thickness is 85% or higher, more preferably 90% or higher, further preferably 92% or higher.

Among these thermoplastic resins, acrylic resins are particularly preferred for their excellent optical characteristics, heat resistance, and molding processability.

As the thermoplastic resin composition in one or more embodiments of the present invention, the thermoplastic resin composition containing the thermoplastic resin that is the matrix resin and the rubber particles can be used, and especially an acrylic resin composition containing acrylic resin that is the matrix resin and the rubber particles can be used. In the thermoplastic resin composition containing the rubber particles, rubber itself is a component that is less likely to be relaxed. Therefore, the die line is easily formed. However, according to one or more embodiments of the present invention, although the thermoplastic resin composition contains the rubber particles, the formation of the die line can be suppressed by adjusting the relaxation modulus of the thermoplastic resin composition in advance.

The following will specifically explain the acrylic resin composition to which one or more embodiments of the present invention is suitably applicable and which contains acrylic resin and rubber particles.

(Acrylic Resin)

In one or more embodiments of the present invention, any acrylic resin may be used as long as it is a resin obtained by polymerization of a vinyl-based monomer containing (meth) acrylic ester. The acrylic resin containing 30 to 100 wt. % of a structural unit derived from methyl methacrylate and 70 to 0 wt. % of a structural unit derived from a monomer copolymerizable with the structural unit derived from methyl methacrylate is more preferable.

A preferred example of another vinyl-based monomer copolymerizable with methyl methacrylate is (meth)acrylic ester (except for methyl methacrylate) whose alkyl residue has 1 to 10 carbon atoms. Specific examples of such another vinyl-based monomer copolymerizable with methyl methacrylate include: methacrylic esters such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylic esters such as methyl acrylate, ethyl acrylate, butyl acrylate, 2-ethylhexyl acrylate, glycidyl acrylate, epoxycyclohexylmethyl acrylate, 2-hydroxyethyl acrylate, 2-hydroxypropyl acrylate; carboxylic acids such as methacrylic acid and acrylic acid and esters thereof; vinyl cyanides such as acrylonitrile and methacrylonitrile; vinyl arenes such as styrene, α-methyl styrene, monochlorostyrene, and dichlorostyrene; maleic acid and fumaric acid and esters thereof; vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetraethyleneglycol dimethacrylate, tetraethyleneglycol dimethacrylate, and divinyl benzene. These vinyl-based monomers may be used singly or in combination of two or more of them.

The methyl methacrylate polymer contains methyl methacrylate in an amount of preferably 30 to 100 wt. %, more preferably 50 to 99.9 wt. %, further preferably 50 to 98 wt. % and the monomer copolymerizable with methyl methacrylate in an amount of preferably 70 to 0 wt. %, more preferably 50 to 0.1 wt. %, further preferably 50 to 2 wt. %. If the methyl methacrylate content is less than 30 wt. %, optical characteristics, appearance, weather resistance, and heat resistance specific to acrylic resins tend to be degraded. From the viewpoint of processability and appearance, it is preferred that a polyfunctional monomer is not used.

The glass transition temperature of the thermoplastic resin used in one or more embodiments of the present invention can be set according to use conditions and intended use, but is preferably 100° C. or higher, more preferably 110° C. or higher, even more preferably 115° C. or higher, most preferably 120° C. or higher.

A specific example of an acrylic resin having a glass transition temperature of 120° C. or higher is an acrylic resin containing a maleimide structure, a glutarimide structure, a glutaric anhydride structure, a (meth)acrylic acid unit, or a lactone ring in its molecule. Examples of such an acrylic resin include maleimide acrylic resins, glutarimide acrylic resins, glutaric anhydride acrylic resins, lactone ring-containing acrylic resins, hydroxyl group- and/or carboxyl group-containing acrylic resins, methacrylic resins, partially-hydrogenated styrene-containing acrylic polymers obtained by partial hydrogenation of aromatic rings of a styrene-containing acrylic polymer obtained by polymerization of a styrene monomer and another monomer copolymerizable therewith, and acrylic polymers containing a cyclic acid anhydride repeating unit. Examples of other resins having the glass transition temperature of 120° C. or higher include polyethylene terephthalate resins and polybutylene terephthalate resins. Among them, a maleimide acrylic resin and/or a glutarimide acrylic resin, both described later, are particularly preferably used because a resulting film has improved heat resistance and also has excellent optical characteristics when stretched. As the thermoplastic resin, it is especially preferable to use both the maleimide acrylic resin and the glutarimide acrylic resin. These resins are high in miscibility and can maintain their excellent transparency when both resins are used. Further, these resins are low in orientation birefringence and photoelastic birefringence and can maintain high heat stability and solvent resistance.

(Maleimide Acrylic Resin)

Specifically, the maleimide acrylic resin is a copolymer having a maleimide unit represented by the following general formula (5) and a (meth)acrylic ester unit.

[Chemical Formula 9]

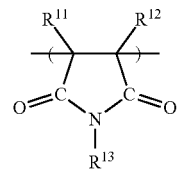

(5)

In the above general formula (5), $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A, group A: halogen atom, hydroxyl group, nitro group, alkoxy group having 1 to 12 carbon atoms, alkyl group having 1 to 12 carbon atoms, and arylalkyl group having 7 to 14 carbon atoms.

<$R^{11}$ and $R^{12}$>

The alkyl group having 1 to 12 carbon atoms as $R^{11}$ and $R^{12}$ is preferably an alkyl group having 1 to 6 carbon atoms, more preferably an alkyl group having 1 to 4 carbon atoms. Examples of the alkyl group having 1 to 12 carbon atoms as $R^{11}$ and $R^{12}$ include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the aryl group having 6 to 14 carbon atoms as $R^{11}$ and $R^{12}$ include a phenyl group, a naphthyl group, and an anthracenyl group. Among them, from the viewpoint of further improving heat resistance and optical characteristics such as low birefringence, a phenyl group is preferred.

$R^{11}$ and $R^{12}$ are preferably a hydrogen atom, an alkyl group having 1 to 4 carbon atoms, or a phenyl group, more preferably a hydrogen atom.

<$R^{13}$>

Examples of the arylalkyl group having 7 to 14 carbon atoms as $R^{13}$ include a benzyl group, a 1-phenylethyl group, a 2-phenylethyl group, a 3-phenylpropyl group, a 6-phenylhexyl group, and an 8-phenyloctyl group. Among them, from the viewpoint of further improving heat resistance and optical characteristics such as low birefringence, a benzyl group is preferred.

Examples of the aryl group having 6 to 14 carbon atoms as $R^{13}$ include a phenyl group, a naphthyl group, and an anthracenyl group. Among them, from the viewpoint of further improving heat resistance and optical characteristics such as low birefringence, a phenyl group is preferred.

$R^{13}$ may be an aryl group having 6 to 14 carbon atoms and a substituent group. Here, the substituent group is selected from the group (group A) consisting of a halogen atom, a hydroxyl group, a nitro group, an alkoxy group having 1 to 12 carbon atoms, an alkyl group having 1 to 12 carbon atoms, and an arylalkyl group having 7 to 14 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms as the substituent group include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the arylalkyl group having 7 to 14 carbon atoms as the substituent group include a benzyl group, a 1-phenylethyl group, a 2-phenylethyl group, a 3-phenylpropyl group, a 6-phenylhexyl group, and an 8-phenyloctyl group. Among them, a benzyl group, a 1-phenylethyl group, a 2-phenylethyl group, and a 3-phenylpropyl group are preferred.

The aryl group having 6 to 14 carbon atoms and a substituent group as $R^{13}$ is preferably a phenyl group having a substituent group or a naphthyl group having a substituent group. Examples of the aryl group having 6 to 14 carbon atoms and a substituent group include a 2,4,6-tribromophenyl group, a 2-chlorophenyl group, a 4-chlorophenyl group, a 2-bromophenyl group, a 4-bromophenyl group, a 2-methylphenyl group, a 4-methylphenyl group, a 2-ethylphenyl group, a 4-ethylphenyl group, a 2-methoxyphenyl group, a 4-methoxyphenyl group, a 2-nitrophenyl group, a 4-nitrophenyl group, and a 2,4,6-trimethylphenyl group. Among them, from the viewpoint of imparting flame retardancy, a 2,4,6-tribromophenyl group is preferred.

Examples of the cycloalkyl group having 3 to 12 carbon atoms as $R^{13}$ include a cyclopropyl group, a cyclobutyl group, a cyclopentyl group, a cyclohexyl group, a cycloheptyl group, a cyclooctyl group, a tricyclodecyl group, a bicyclooctyl group, a tricyclododecyl group, an isobornyl group, an adamantyl group, and a tetracyclododecyl group. Among them, a cyclopropyl group, a cyclobutyl group, a cyclopentyl group, a cyclohexyl group, a cycloheptyl group, and a cyclooctyl group are preferred, and from the viewpoint of further improving weather resistance and optical characteristics such as transparency and imparting low water absorbability, a cyclohexyl group is more preferred.

The alkyl group having 1 to 18 carbon atoms as $R^{13}$ is preferably an alkyl group having 1 to 10 carbon atoms, more preferably an alkyl group having 1 to 8 carbon atoms. Examples of the alkyl group having 1 to 18 carbon atoms as $R^{13}$ include a methyl group, an ethyl group, a n-propyl group, an isopropyl group, a n-butyl group, an isobutyl group, a t-butyl group, a n-pentyl group, a n-hexyl group, a n-octyl group, a n-dodecyl group, a n-octadecyl group, a 2-ethylhexyl group, a 1-decyl group, and a 1-dodecyl group. Among them, from the viewpoint of further improving weather resistance and optical characteristics such as transparency, a methyl group, an ethyl group, and an isopropyl group are preferred.

$R^{13}$ may be an alkyl group having 1 to 12 carbon atoms and a substituent group. Here, the substituent group is selected from the group (group A) consisting of a halogen atom, a hydroxyl group, a nitro group, and an alkoxy group having 1 to 12 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms and a substituent group as $R^{13}$ include a dichloromethyl group, a trichloromethyl group, a trifluoroethyl group, and a hydroxyethyl group. Among them, a trifluoroethyl group is preferred.

Specific examples of the maleimide unit represented by the general formula (5) include an unsubstituted maleimide unit, an N-methylmaleimide unit, an N-phenylmaleimide unit, an N-cyclohexylmaleimide unit, and an N-benzylmaleimide unit.

Only one kind of maleimide unit may be used, or two or more kinds of maleimide units may be used in combination.

The maleimide unit content of the maleimide acrylic resin is not particularly limited, and can be appropriately determined in consideration of, for example, the structure of $R^{13}$. However, the maleimide unit content is preferably 1.0 wt. % or more, more preferably 1 wt. % to 99 wt. %, even more preferably 1 wt. % to 80 wt. % with respect to the total weight of the maleimide acrylic resin. If the maleimide unit content is not within the above range, optical isotropy tends to be poor.

The (meth)acrylic ester unit that the maleimide acrylic resin has may be the same as a unit represented by a general formula (2) that will be described later with reference to the glutarimide acrylic resin. Particularly, from the viewpoint of transparency, the maleimide acrylic resin preferably contains a methyl methacrylate unit. The (meth)acrylic ester unit content of the maleimide acrylic resin is not particularly limited, but is preferably 1 to 99 wt. %, more preferably 10 to 95 wt. %, even more preferably 10 to 90 wt. % with respect to the total weight of the maleimide acrylic resin. Only one kind of (meth)acrylic ester unit may be used, or two or more kinds of (meth)acrylic ester units may be used in combination.

The maleimide acrylic resin preferably further has a unit represented by the following general formula (3) to adjust optical characteristics:

[Chemical Formula 10]

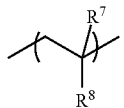

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The maleimide acrylic resin may contain only one kind of unit represented by the above general formula (3) or may contain two or more kinds of units represented by the above general formula (3) between which one of $R^7$ and $R^8$ is different or both of them are different.

The amount of the unit represented by the general formula (3) contained in the maleimide acrylic resin is not particularly limited, but is preferably 0 to 40 wt. %, more preferably 0 to 20 wt. %, particularly preferably 0 to 15 wt. % with respect to the total weight of the maleimide acrylic resin.

If necessary, the maleimide acrylic resin may further contain another unit other than the units described above.

The weight-average molecular weight of the maleimide acrylic resin is not particularly limited, but is preferably in the range of $1 \times 10^4$ to $5 \times 10^5$. By setting the weight-average molecular weight of the maleimide acrylic resin to a value within the above range, it is possible to prevent deterioration of molding processability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, molding processability tends to be deteriorated, and molded article productivity tends to be reduced.

The maleimide acrylic resin can be obtained by, for example, the following polymerization step. Further, the maleimide acrylic resin can be refined by the following devolatilization step.

(Polymerization Step)

The maleimide acrylic resin can be obtained by polymerizing monomers selected from the monomers described above as its structural units.

In a polymerization reaction to obtain the maleimide acrylic resin according to one or more embodiments, monomers whose reactivities are close to each other and/or monomers whose copolymerizabilities are high are preferably combined because the compositional ratio of a resulting maleimide acrylic resin can be easily controlled based on the compositional ratio of raw materials charged into a reaction liquid. On the other hand, if monomers whose reactivities are significantly different are combined, issues may occur such as a) a monomer having low reactivity does not sufficiently react and remains as an unreacted monomer and a problem b) the compositional ratio of a resulting maleimide acrylic resin is difficult to be predicted. Particularly, if the unreacted monomer remains, the characteristics of the maleimide acrylic resin, such as transparency and light resistance, are deteriorated.

Examples of a polymerization method that can be used to obtain the maleimide acrylic resin include common polymerization methods such as cast polymerization, bulk polymerization, suspension polymerization, solution polymerization, emulsion polymerization, living radical polymerization, and anion polymerization. In order to use the maleimide acrylic resin as an optical material, mixing of minute foreign matter into the maleimide acrylic resin is preferably avoided as much as possible. From such a viewpoint, cast polymerization, solution polymerization, or suspension polymerization is preferably used, and cast polymerization or solution polymerization not using a suspension agent or an emulsifying agent is more preferably used.

A polymerization mode may be, for example, either batch polymerization or continuous polymerization. From the viewpoint of simple polymerization operation, batch polymerization is preferred, and from the viewpoint of obtaining a polymer more uniform in composition, continuous polymerization is preferred.

The temperature and time of the polymerization reaction can be appropriately adjusted depending on the types of monomers used or the ratio between monomers used. For example, the polymerization temperature is 0 to 150° C. and the polymerization time is 0.5 to 24 hours, and preferably, the polymerization temperature is 40 to 150° C. and the polymerization time is 1 to 15 hours.

In a radical polymerization reaction, a polymerization initiator may be added, if necessary. As the polymerization initiator, any initiator commonly used in radical polymerization can be used. Examples of such an initiator include: organic peroxides such as cumene hydroperoxide, diisopropylbenzene hydroperoxide, di-t-butyl peroxide, lauroyl peroxide, benzoyl peroxide, t-butyl peroxy isopropyl carbonate, t-amyl peroxy-2-ethyl hexanoate, and lauroyl peroxide; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate. These polymerization initiators may be used singly or in combination of two or more of them.

The amount of the polymerization initiator to be used is not particularly limited and may be appropriately set depending on the combination of monomers or reaction conditions, but is preferably in the range of 0.005 to 5 mass %.

A molecular weight modifier used in the polymerization reaction, if necessary, is any molecular weight modifier commonly used in radical polymerization. Particularly preferred examples of such a molecular weight modifier include mercaptan compounds such as butyl mercaptan, octyl mercaptan, dodecyl mercaptan, and 2-ethylhexyl thioglycolate. Such a molecular weight modifier is added at a concentration within such a range that the molecular weight is controlled to be within the above range.

When a solvent is used in the polymerization reaction, examples of the polymerization solvent include: aromatic hydrocarbon-based solvents such as toluene, xylene, and ethyl benzene; ketone-based solvents such as methyl ethyl ketone and methyl isobutyl ketone; and ether-based solvents such as tetrahydrofuran. These solvents may be used singly or in combination of two or more of them. If the boiling point of the solvent used is too high, the finally-obtained maleimide acrylic resin has a high residual volatile matter content. For this reason, a solvent having a boiling point of 50 to 200° C. is preferred.

In the polymerization reaction, an organic phosphorus compound or an organic acid may be added, if necessary. When these compounds coexist, there may be case where a side reaction is suppressed and/or the amount of unreacted N-substituted maleimide is reduced so that coloring of a resulting maleimide acrylic resin during molding process is reduced.

Examples of the organic phosphorus compound include: alkyl(aryl)phosphonous acid and diesters or monoesters thereof; dialkyl(aryl)phosphine acid and esters thereof; alkyl (aryl)phosphonic acid and diesters or monoesters thereof; alkyl phosphonous acid and esters thereof; phosphorous acid diesters, phosphorous acid monoesters, and phosphorous acid triesters; phosphoric diesters, phosphoric monoesters, and phosphoric triesters. These organic phosphorus compounds may be used singly or in combination of two or more of them. The amount of the organic phosphorus compound to be used is preferably 0.001 to 5.0 mass % with respect to the total mass of monomers.

Examples of the organic acid include acetic acid, propionic acid, butyric acid, valeric acid, caproic acid, caprylic acid, capric acid, lauric acid, stearic acid, oleic acid, linoleic acid, linolenic acid, benzoic acid, cyclohexanecarboxylic acid, phthalic acid, isophthalic acid, and terephthalic acid, and acid anhydrides thereof. These organic acids may be used singly or in combination of two or more of them. The amount of the organic acid to be used is preferably 0.001 to 1.0 mass % with respect to the total mass of monomers.

The polymerization reaction is preferably performed at a polymer concentration of 10 to 95 mass %, more preferably 75 mass % or less, even more preferably 60 mass % or less to achieve an appropriate viscosity of a reaction liquid from the viewpoint of removing heat during polymerization. When the polymer concentration is 10 mass % or more, the adjustment of molecular weight and molecular weight distribution is easily performed. When the polymer concentration is 95 mass % or less, a polymer having a high molecular weight can be obtained.

From the viewpoint of maintaining an appropriate viscosity of the obtained polymerization reaction liquid, a polymerization solvent can be appropriately added. By maintaining an appropriate viscosity of the reaction liquid, heat removal can be controlled and the generation of microgels in the reaction liquid can be suppressed. Particularly, in the latter half of the polymerization reaction in which the viscosity increases, it is more preferred that the polymer concentration is controlled to be 50 mass % or less by appropriately adding the polymerization solvent.

The mode of appropriately adding the polymerization solvent to the polymerization reaction liquid is not particularly limited. For example, the polymerization solvent may be added continuously or intermittently. By controlling the concentration of the maleimide acrylic resin formed in the polymerization reaction liquid in this way, the uniformity of temperature in the reactor can be improved and gelation of the reaction liquid can be more sufficiently suppressed. The polymerization solvent to be added may be, for example, the same as or different from a solvent initially charged to perform the polymerization reaction. However, a solvent that is the same as a solvent initially charged to perform the polymerization reaction is preferably used. The polymerization solvent to be added may be a single solvent of only one kind of solvent or a mixed solvent of two or more kinds of solvents.

When the maleimide acrylic resin is obtained by suspension polymerization, a suspension agent and, if necessary, an auxiliary suspension agent are added to an aqueous medium. Examples of the suspension agent include: water-soluble polymers such as polyvinyl alcohol, methyl cellulose, polyoxyethylene-polyoxypropylene block copolymer, polyethylene oxide, and polyacrylamide; and inorganic substances such as calcium phosphate and magnesium pyrophosphate. The amount of the water-soluble polymer to be used is preferably 0.01 to 2 mass % with respect to the total mass of monomers, and the amount of the inorganic substance to be used is preferably 0.01 to 2 mass % with respect to the total mass of monomers. Examples of the auxiliary suspension agent include: low-molecular weight surfactants such as anion surfactants such as sodium dodecylbenzene sulfonate, sodium lauryl sulfate, sodium alkyl naphthalene sulfonate, and sodium dialkylsulfosuccinate; and water-soluble inorganic salts such as boric acid, sodium carbonate, disodium hydrogen phosphate, sodium dihydrogen phosphate, and sodium sulfate. The auxiliary suspension agent is preferably disodium hydrogen phosphate or sodium dodecylbenzene sulfonate. When an inorganic substance is used as the suspension agent, the auxiliary suspension agent is preferably used. The auxiliary suspension agent is preferably used in an amount of 0.001 to 2 mass % per 100 mass % of monomers.

(Devolatilization Step)

The devolatilization step means a step in which volatile components such as a polymerization solvent, residual monomers, and water are removed by the application of heat under reduced pressure, if necessary. If such removal treatment is insufficient, a resulting maleimide acrylic resin has a high residual volatile matter content, and therefore the maleimide acrylic resin may be colored due to alteration or the like during molding, or molding defects such as bubbles or silver streaks may occur. The residual volatile matter content is 1 mass % or less, preferably 0.5 mass % or less, more preferably 0.4 mass % or less, even more preferably 0.3 mass % or less per 100 mass % of the maleimide acrylic resin. The residual volatile matter content corresponds to the total amount of residual monomers that have not been reacted in the above-described polymerization reaction, a polymerization solvent, and a side-reaction product.

Examples of an apparatus used in the devolatilization step include a devolatilization apparatus including a heat exchanger and a devolatilization tank; a vent-equipped extruder; and an apparatus in which a devolatilizer and an extruder are arranged in series. When a vent-equipped extruder is used, the extruder may have one vent or two or more vents, but preferably has two or more vents.

The temperature of the devolatilization step is preferably 150 to 350° C., more preferably 170 to 330° C., even more preferably 200 to 300° C. If the temperature is less than 150° C., there is a case where the maleimide acrylic resin has a high residual volatile matter content. On the other hand, if the temperature exceeds 350° C., there is a case where a resulting maleimide acrylic resin is colored or decomposed.

The pressure of the devolatilization step is preferably 931 to 1.33 hPa (700 to 1 mmHg), more preferably 800 to 13.3 hPa (600 to 10 mmHg), even more preferably 667 to 20.0 hPa (500 to 15 mmHg). If the pressure exceeds 931 hPa (700 mmHg), there is a case where volatile matter is likely to remain. On the other hand, if the pressure is less than 1.33 hPa (1 mmHg), there is a case where devolatilization is difficult to be industrially performed.

The treatment time is appropriately selected depending on the amount of residual volatile matter, but is preferably as short as possible in order to suppress the coloring or decomposition of a resulting maleimide acrylic resin.

In a case where the reaction conversion rate of monomers in the polymerization reaction is low, a large amount of unreacted monomers remains in the polymerization solution. In this case, treatment needs to be performed for a long time at a high treatment temperature to reduce the residual volatile matter content of a resulting maleimide acrylic resin. However, coloring or decomposition is likely to occur. In a case where the polymerization reaction liquid containing a large amount of unreacted monomers is treated, the unreacted monomers can be removed from the polymerization reaction liquid by, for example, performing pretreatment in which an aromatic hydrocarbon-based solvent, a hydrocarbon-based solvent, an alcohol-based solvent or the like is added to the polymerization solution, homogenizer (emulsion and dispersion) treatment is then performed, and liquid-liquid extraction or solid-liquid extraction is performed. When the polymerization reaction liquid after separation of the monomers by the pretreatment is subjected to the devolatilization step, the total amount of monomers remaining in 100 mass % of a resulting thermoplastic resin can be reduced to 1 mass % or less.

(Glutarimide Acrylic Resin)

The glutarimide acrylic resin has a glass transition temperature of 120° C. or higher and contains a unit represented by the following general formula (1) and a unit represented by the following general formula (2):

[Chemical Formula 11]

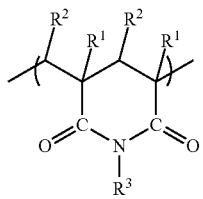

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (1) is also referred to as "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin may contain only one kind of glutarimide unit or two or more kinds of glutarimide units between which any one of $R^1$, $R^2$, and $R^3$ in the above general formula (1) is different or all of them are different.

The glutarimide unit can be formed by imidizing a (meth)acrylate unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin is not particularly limited, and can be appropriately determined in consideration of, for example, the structure of $R^3$. However, the glutarimide unit content is preferably 1.0 wt. % or more, more preferably 3.0 wt. % to 90 wt. %, even more preferably 5.0 wt. % to 60 wt. % with respect to the total weight of the glutarimide acrylic resin. If the glutarimide unit content is less than the above lower limit, a resulting glutarimide acrylic resin tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength of a resulting film when the film is processed, or impair transparency.

The glutarimide unit content is calculated in the following manner.

The resin is subjected to $^1$H-NMR analysis using $^1$H-NMR BRUKER Avance III (400 MHz) to determine the amount (mol %) of each monomer unit, such as a glutarimide unit or an ester unit, contained in the resin, and then the monomer unit content (mol %) is converted to a monomer unit content (wt. %) using the molecular weight of each monomer unit.

For example, when the resin is composed of a glutarimide unit whose $R^3$ in the above general formula (1) is a methyl group and a methyl methacrylate unit, a glutarimide unit content (wt. %) can be determined from the following calculation formula using the area a of a peak derived from protons of O—CH$_3$ of methyl methacrylate and appearing at about 3.5 to 3.8 ppm and the area b of a peak derived from protons of N—CH$_3$ of glutarimide and appearing at about 3.0 to 3.3 ppm.

[Methyl methacrylate unit content $A$ (mol %)]= 100×$a/(a+b)$

[Glutarimide unit content $B$ (mol %)]=100×$b/(a+b)$

[Glutarimide unit content (wt. %)]=100×($b$×(molecular weight of glutarimide unit)/($a$×(molecular weight of methyl methacrylate unit)+$b$×(molecular weight of glutarimide unit))

It is to be noted that even when the resin contains a monomer unit other than the above units, the glutarimide unit content (wt. %) can be determined in the same manner as described above from the amount (mol %) of each monomer unit contained in the resin and the molecular weight of each monomer unit.

When the film according to one or more embodiments of the present invention is used for, for example, a polarizer protective film, the glutarimide unit content is preferably 20 wt. % or less, more preferably 15 wt. % or less, even more preferably 10 wt. % or less because birefringence is more likely to be suppressed.

[Chemical Formula 12]

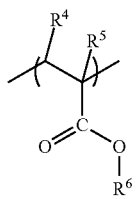

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (2) is also referred to as "(meth)acrylate unit". It is to be noted that in this specification, "(meth)acryl" refers to "methacryl or acryl".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acrylate unit or two or more kinds of (meth)acrylate units between which any one of $R^4$, $R^5$, and $R^6$ in the above general formula (2) is different or all of them are different.

If necessary, the glutarimide acrylic resin may further contain a unit represented by the following general formula (3) (hereinafter, also referred to as "aromatic vinyl unit"):

[Chemical Formula 13]

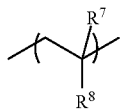

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-styrene unit. The aromatic vinyl unit is preferably a styrene unit.

The glutarimide acrylic resin may contain only one kind of aromatic vinyl unit or two or more kinds of aromatic vinyl units between which one of $R^7$ and $R^8$ is different or both of them are different.

The aromatic vinyl unit content of the glutarimide acrylic resin is not particularly limited, but is preferably 0 to 50 wt. %, more preferably 0 to 20 wt. %, particularly preferably 0 to 15 wt. % with respect to the total weight of the glutarimide acrylic resin. If the aromatic vinyl unit content exceeds the above upper limit, the glutarimide acrylic resin cannot have sufficient heat resistance.

However, in one or more embodiments of the present invention, the glutarimide acrylic resin preferably contains no aromatic vinyl unit from the viewpoint of improving bending resistance and transparency, reducing fish-eyes, and improving solvent resistance or weather resistance.

If necessary, the glutarimide acrylic resin may further contain another unit other than the glutarimide unit, the (meth)acrylate unit, and the aromatic vinyl unit.

Examples of the another unit include amide-based units such as acrylamide and methacrylamide, a glutaric anhydride unit, nitrile-based units such as acrylonitrile and methacrylonitrile, and maleimide-based units such as maleimide, N-methylmaleimide, N-phenylmaleimide, and N-cyclohexylmaleimide.

The another unit may be incorporated into the glutarimide acrylic resin by random copolymerization or graft copolymerization.

The another unit may be incorporated by copolymerization of a monomer constituting the another unit with a resin as a raw material for producing the glutarimide acrylic resin. Alternatively, the another unit incorporated into the glutarimide acrylic resin may be a by-product of the above-described imidization reaction.

The weight-average molecular weight of the glutarimide acrylic resin is not particularly limited, but is preferably in the range of $1 \times 10^4$ to $5 \times 10^5$. By setting the weight-average molecular weight of the glutarimide acrylic resin to a value within the above range, it is possible to prevent deterioration of molding processability or to prevent a resulting film from having poor mechanical strength when the film is processed. If the weight-average molecular weight is less than the above lower limit, a resulting film tends to have poor mechanical strength. On the other hand if the weight-average molecular weight exceeds the above upper limit, viscosity during melt extrusion tends to be high, molding processability tends to be deteriorated, and molded article productivity tends to be reduced.

The glass transition temperature of the glutarimide acrylic resin is preferably 120° C. or higher so that a resulting film can have excellent heat resistance. More preferably, the glass transition temperature of the glutarimide acrylic resin is 125° C. or higher. If the glass transition temperature of the glutarimide acrylic resin is lower than the above lower limit, a resulting film cannot have sufficient heat resistance.

Hereinbelow, one example of a method for producing the glutarimide acrylic resin will be described.

First, a (meth)acrylate polymer is produced by polymerization of (meth)acrylate. When the glutarimide acrylic resin contains an aromatic vinyl unit, a (meth)acrylate-aromatic vinyl copolymer is produced by copolymerization of (meth)acrylate and an aromatic vinyl compound.

The (meth)acrylate used in this step is preferably, for example, methyl(meth)acrylate, ethyl(meth)acrylate, butyl (meth)acrylate, isobutyl(meth)acrylate, t-butyl(meth)acrylate, benzyl(meth)acrylate, or cyclohexyl(meth)acrylate, and is more preferably methyl methacrylate.

These (meth)acrylates may be used singly or in combination of two or more of them. The use of two or more kinds of (meth)acrylates makes it possible to finally obtain a glutarimide acrylic resin containing two or more kinds of (meth)acrylate units.

The structure of the (meth)acrylate polymer or the (meth)acrylate-aromatic vinyl copolymer is not particularly limited as long as a subsequent imidization reaction can be performed. More specifically, the (meth)acrylate polymer or the (meth)acrylate-aromatic vinyl copolymer may be a linear polymer, a block polymer, a branched polymer, a ladder polymer, or a cross-linked polymer.

In the case of a block polymer, the block polymer may be any one of an A-B-type block polymer, an A-B-C-type block polymer, an A-B-A-type block polymer, or another type of block polymer.

Then, the (meth)acrylate polymer or the (meth)acrylate-aromatic vinyl copolymer is reacted with an imidization agent to perform an imidization reaction. In this way, a glutarimide acrylic resin can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin can be adjusted by adjusting the ratio of the imidization agent added.

A method for performing the imidization reaction is not particularly limited, and a conventionally-known method can be used. For example, the imidization reaction is allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the raw material polymer, the imidization agent, and the ring-closing agent).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the raw material polymer, the imidization agent, and the ring-closing promoter) can be further promoted.

The above-mentioned extruders may be used singly or in combination of two or more of them serially connected.

The glutarimide acrylic resin production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin to a value within a desired range.

The acid value of the glutarimide acrylic resin is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin can offer an excellent balance of heat resistance, mechanical properties, and molding processability. On the other hand, if the acid value exceeds the above upper limit, foaming of the resin is likely to occur during melt extrusion for film formation, which tends to deteriorate molding processability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilylchloride, isopropenyl acetate, dimethyl urea, tetramethylammonium hydroxide, dimethyldiethoxysilane, tetra-N-butoxysilane, dimethyl (trimethylsilane)phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterification agent to be used is not particularly limited, but is preferably 0 to 12 parts by weight, more preferably 0 to 8 parts by weight per 100 parts by weight of the (meth)acrylate polymer or the (meth)acrylate-aromatic vinyl polymer. By setting the amount of the esterification agent to be used to a value within the above range, it is possible to adjust the acid value of the glutarimide acrylic resin to a value within an appropriate range. On the other hand, if the amount of the esterification agent to be used is not within the above range, there is a possibility that part of the esterification agent will remain unreacted in the resin, which may cause foaming or odor generation when molding is performed using the resin.

A catalyst may also be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterification agent. The heat treatment can be achieved by kneading and dispersing the melted resin in an extruder. When only the heat treatment is performed as the esterification step, some or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin can also be appropriately produced using, instead of an extruder, a high-viscosity reaction apparatus such as a horizontal twin screw reaction apparatus, such as BIVOLAK manufactured by Sumitomo Heavy Industries, Ltd., or a vertical twin screw mixing vessel such as SUPER BLEND.

When the glutarimide acrylic resin is produced using a batch-type reactor (pressure vessel), the structure of the batch-type reactor (pressure vessel) is not particularly limited. More specifically, the batch-type reactor shall have a structure in which the raw material polymer can be melted by heating and stirred and the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Example of a batch-type reactor having such a structure include a mixing vessel MAX BLEND manufactured by Sumitomo Heavy Industries, Ltd. and the like.

In such a way as described above, the glutarimide acrylic resin whose glutarimide unit content is controlled to a specific value can be easily produced.

When the maleimide acrylic resin and the glutarimide acrylic resin are used in combination, the maleimide acrylic resin content of the film can be appropriately determined depending on desired physical properties of the film. For example, the maleimide acrylic resin content of the film is preferably 1 to 99 parts by weight per 100 parts by weight of the total amount of the maleimide acrylic resin and the glutarimide acrylic resin. The maleimide acrylic resin content is more preferably 1 to 80 parts by weight, even more preferably 5 to 70 parts by weight.

(Rubber Particles)

The mechanical strengths, such as bending resistance and trimming property, of the film can be increased by blending the rubber particles in the thermoplastic resin composition of one or more embodiments of the present invention. From the viewpoint of the miscibility with the matrix resin, acrylic rubber particles are preferable as the rubber particles.

By blending, as the rubber particles, cross-linked structure-containing polymers having the photoelastic constant which is opposite in sign to the photoelastic constant of the thermoplastic resin, both the orientation birefringence and photoelastic constant of the thermoplastic resin composition can be reduced, and the thermoplastic resin composition can obtain high optical isotropy. In order to achieve optical isotropy, how to reduce orientation birefringence and photoelastic birefringence is important. Therefore, the concepts of "orientation birefringence" and "photoelastic birefringence" of each of the thermoplastic resin, the rubber particles, the thermoplastic resin composition, and the film in one or more embodiments of the present invention will be first described below.

(Concept of Orientation Birefringence)

When a film is produced not by molding performed under such conditions that a polymer is oriented in a film, such as high discharge conditions, film drawing conditions, or low temperature conditions, but by normal melt extrusion molding, a polymer is not very highly oriented in the film. Actually, in the case of an acrylic resin typified by PMMA, its film formed by melt extrusion without intentionally subjected to a stretching process (hereinafter, also referred to as "original film" or "raw material film") does not have very high birefringence, and therefore can sometimes be practically used depending on its intended use. Of course, when a film is formed by molding performed under such conditions that a polymer is oriented or an original film is subjected to a stretching process, a polymer is oriented in the film so that the film has birefringence. Such birefringence is due to polymer orientation, and is therefore generally called orientation birefringence. As described above, the orientation birefringence of a molded body, especially an optical film, made of the thermoplastic resin composition according to one or more embodiments of the present invention depends on how the thermoplastic resin composition according to one or more embodiments of the present invention is molded or, in the case of a film, whether the film is stretched or not. In order to reduce the birefringence of the molded body, especially the optical film, it is necessary to set the orientation birefringence of the rubber particle and the orientation birefringence of the thermoplastic resin. On the other hand, when polymer orientation hardly occurs in a molded body such as a film so that the birefringence of the molded body is sufficiently low, the orientation birefringence of the rubber particle does not need to be greatly taken into consideration and is therefore not particularly limited when resin design is performed.

The measuring conditions of "orientation birefringence" in one or more embodiments of the present invention will be defined as follows. As described above, orientation birefringence develops due to orientation of polymer chains, but birefringence (orientation birefringence) in a polymer film varies depending on the degree of orientation of polymer chains. Therefore, in one or more embodiments of the present invention, "orientation birefringence" is measured under conditions defined as follows.

Each of the thermoplastic resin, the rubber particle, and the thermoplastic resin composition needs to be formed into a some form of molded body to measure its orientation birefringence. In one or more embodiments of the present invention, the molded body is defined as a film or sheet. Hereinbelow, measurement of "orientation birefringence" will be described with reference to a case where the molded body is a melt-extrusion molded film or a press-molded sheet.

Measurement of "Orientation Birefringence" of Film

First, a test specimen of 25 mm×90 mm is cut out (so that its longitudinal direction is parallel to MD) from a film (original film) having a film thickness of 125 μm, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence.

Measurement of "Orientation Birefringence" of Sheet

In the case of the rubber particle, it is difficult to form a film only from the rubber particle depending on the structure of the rubber particle. In this case, the rubber particle is formed into a sheet by press molding to measure "orientation birefringence". Also when it is difficult to form a film from, for example, the thermoplastic resin as in the case of the rubber particle, a sheet is formed by press molding to measure orientation birefringence.

Hereinbelow, the measuring conditions of "orientation birefringence" at the time when a sheet formed by press molding is used will be described.

The rubber particle is pressed at 190° C. to prepare a press-molded sheet having a thickness of 500 μm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C., and a sample is taken from the central portion of the film to measure birefringence and determine the sign of orientation birefringence.

The above-described "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

(Concept of Photoelastic Birefringence (Photoelastic Constant))

As has been described above, photoelastic birefringence is birefringence caused by elastic deformation (distortion) of a polymer in a molded body when stress is applied to the molded body. In fact, the intrinsic "photoelastic constant" of the polymer is determined, which makes it possible to evaluate the degree of photoelastic birefringence of the material. First, stress is applied to the polymer material and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the above-described "orientation birefringence", each of the thermoplastic resin, the rubber particle, and the thermoplastic resin composition needs to be formed into a some form of molded body to measure its photoelastic birefringence. In one or more embodiments of the present invention, the molded body is defined as a film or sheet. Hereinbelow, the measurement of "photoelastic constant" will be described with reference to a case where the molded body is a melt-extrusion molded film or a press-molded sheet.

Measurement of "Photoelastic Constant" of Film

As in the case of the above-described "orientation birefringence", a strip-shaped test specimen of 15 mm×90 mm is cut out (so that its longitudinal direction is parallel to TD) from a film (original film) having a film thickness of 125 μm. Then, one of the long sides of the test specimen is fixed, and in this state, birefringence is measured at 23° C. while a load applied to the other long side is increased from 0 kgf to 4 kgf by 0.5-kgf increments. The magnitude of a change in birefringence per unit stress is calculated from the obtained result to determine a photoelastic constant.

Measurement of "Photoelastic Constant" of Sheet

As in the case of the above-described "orientation birefringence", the rubber particle is formed into a sheet by press molding to measure its birefringence to determine a photoelastic constant. Also when it is difficult to form a film from, for example, the thermoplastic resin as in the case of the rubber particle, a sheet is formed by press molding to measure photoelastic birefringence.

Hereinbelow, measurement of "photoelastic constant" at the time when a press-molded sheet is used will be described.

The rubber particle is pressed at 190° C. to prepare a press-molded sheet having a thickness of 500 μm. Then, a test specimen of 25 mm×90 mm is cut out from the central portion of the obtained press-molded sheet. The measuring conditions and calculation method of "photoelastic constant" are the same as those used in the case of the above-described melt-extrusion molded film.

When there is a large difference in thickness between samples to be compared in the measurement of photoelastic birefringences of films and/or sheets, there is a possibility that the samples are different from each other in how stress is applied, and therefore there is a case where it is difficult to strictly compare photoelastic constants between the samples. However, there is not a large difference in how stress is applied between the sample of the film having a thickness of 125 μm and the sample of the press-molded sheet having a thickness of 500 μm described in one or more embodiments of the present invention, and therefore it is possible to compare photoelastic constants between samples when a difference in thickness between the samples is at such a level as described above. Therefore, both the above-described film and press-molded sheet can be appropriately used to measure a photoelastic constant (birefringence), but the film is preferably used. In one or more embodiments of the present invention, a press-molded sheet having a thickness of 500 μm is used as a means for determining the sign of photoelastic constant of the rubber particle. The same applies to orientation birefringence.

The photoelastic birefringence of a polymer is a property intrinsic to the structure of the polymer, and therefore when the photoelastic constant of the thermoplastic resin is large, the photoelastic constant of the rubber particle needs to be opposite in sign to the photoelastic constant of the thermoplastic resin. Further, the rubber particle needs to be added in such an amount that the photoelastic birefringence of the thermoplastic resin can be cancelled out. It is known that additivity is established between the photoelastic constant of a resulting polymer (copolymer) and the photoelastic constants of homopolymers corresponding to monomer species used for copolymerization. Therefore, when the photoelastic constant of the rubber particle is opposite in sign to the photoelastic constant of the thermoplastic resin and is larger, the amount of the rubber particle that needs to be added to reduce the photoelastic birefringence of the thermoplastic resin composition composed of the thermoplastic resin and the rubber particle and the photoelastic birefringence of the film thereof can be made smaller.

As for orientation birefringence, as described above, when the degree of polymer orientation in a molded body, especially an optical film, made of the thermoplastic resin composition according to one or more embodiments of the present invention is not so high and therefore the orientation birefringence of the molded body does not become an issue when the molded body is practically used, it is not particularly necessary to take the orientation birefringence of the rubber particle into consideration when the rubber particle is designed. However when the orientation birefringence of the resulting molded body becomes an issue when the molded body is practically used, the orientation birefringence of the rubber particle needs to be made opposite in sign to the orientation birefringence of the thermoplastic resin.

The rubber particle used in one or more embodiments of the present invention shall be a polymer having a weight-average molecular weight exceeding preferably 5,000, more preferably 10,000 or more, further preferably 20,000 or more. If the weight-average molecular weight is less than 5,000, there is a fear that the physical properties, such as mechanical properties, heat resistance, and hardness, of a resulting molded body are deteriorated or the appearance of a resulting molded body is impaired due to bleeding out on the surface of the molded body during high-temperature molding process.

The rubber particle preferably has a cross-linked structure in part thereof from the viewpoint of improving mechanical strength and optical isotropy, and may be, for example, a multi-layered polymer having a cross-linked polymer layer. The multi-layered particle preferably has a hard polymer part from the viewpoint of heat resistance, and preferably has a non-cross-linked structure from the viewpoint of reducing birefringence, and particularly preferably has a hard polymer part having a non-cross-linked structure. For example, the multi-layered particle may be a multi-layered polymer having a hard polymer layer. The multi-layered particle is more preferably a multi-layered polymer containing a cross-linked polymer layer and a hard polymer layer. In general, a multi-layered polymer is also referred to as a graft copolymer or a core-shell polymer, and the multi-layered particle used in one or more embodiments of the present invention includes these polymers.

There is a case where a film needs to have high heat resistance and mechanical strength. Particularly, when used as an optical film for liquid crystal displays, the molded body needs to have high heat resistance, because it is exposed to high temperature when subjected to a film coating process or the like during production as well as when practically used. Further, the molded body needs to have mechanical strength such as trimming property or crack resistance, because a punching process or the like is performed after film coating or bonding to another member as well as during film production. In this case, addition of the multi-layered particle whose cross-linked polymer layer is "soft" to the matrix resin makes it possible to significantly improve mechanical strength and achieve high heat resistance at the same time. In order to obtain such an effect, the multi-layered particle is preferably a graft copolymer (core-shell polymer) having a soft cross-linked polymer layer and a hard polymer layer. Usually, addition of a soft polymer is performed as one of the ways to improve mechanical strength, but in this case, a matrix resin and the soft polymer are uniformly mixed, which is disadvantageous in that a resulting molded body has low heat resistance. On the other hand, when the multi-layered particle is a graft copolymer (core-shell polymer) having a soft cross-linked polymer layer and a hard polymer layer, a resulting molded body has a discontinuous sea-island structure in which the soft cross-linked polymer layer is "island" and the matrix resin and the hard polymer layer are "sea", and therefore it is possible to obtain an excellent effect that mechanical strength is improved and heat resistance is hardly reduced. Usually, a soft cross-linked polymer is different in composition from a matrix resin, and therefore it is difficult to uniformly disperse the soft cross-linked polymer in the matrix, which deteriorates optical characteristics such as transparency or causes defects such as fish-eyes. However, as described above, when the multi-layered particle is a graft copolymer having both a soft cross-linked polymer layer and a hard polymer layer, it is possible to uniformly disperse the soft cross-linked polymer in the matrix resin.

The term "soft" used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than −20° C.

Further, the term "hard" used herein means that the glass transition temperature of the polymer is 20° C. or higher. If the glass transition temperature of the polymer is lower than 20° C., the composition and the film that contain the multi-layered particle have low heat resistance or coarsening or agglomeration of the multi-layered particle is likely to occur during production of the multi-layered particle.

In this specification, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

When a film produced herein does not need to have very high mechanical strength, the cross-linked polymer layer may be either "soft" or "hard", and the definition of "soft" or "hard" is the same as that described above.

In this specification, a graft ratio is used as a parameter to express the degree of covalent bonding of the hard polymer layer to the cross-linked polymer layer in the multi-layered particle.

The graft ratio of the multi-layered particle is an index representing the weight ratio of the grafted hard polymer layer to the cross-linked polymer layer when the weight of the cross-linked polymer layer is regarded as 100. The graft ratio is preferably 10 to 250%, more preferably 40 to 230%, most preferably 60 to 220%. If the graft ratio is less than 10%, the multi-layered particle is likely to aggregate in a resulting molded body so that there is a fear that transparency is impaired or defects are caused by foreign matter. Further, the tensile elongation at breakage of the film is reduced so that cracking is likely to occur when the film is cut. If the graft ratio exceeds 250%, the melt viscosity of the thermoplastic resin composition during molding, for example during film formation, increases, which tends to deteriorate film formability. The calculation formula of the graft ratio will be described later in the section of Examples.

It is to be noted that there is a case where part of the hard polymer layer is not bonded (grafted) to the cross-linked polymer layer (also referred to as free polymer), but this free polymer is also included in the multi-layered particle.

(Description of Cross-Linked Polymer Layer)

Hereinbelow, a "soft" cross-linked polymer layer and a "hard" polymer layer when the multi-layered particle is a graft copolymer will be described.

1. Description of "Soft" Cross-Linked Polymer Layer

First, the "soft" cross-linked polymer layer will be described. As described above, the term "soft" shall mean that the glass transition temperature of the polymer is less than 20° C., and a rubber-like polymer is preferably used. Specific examples of the rubber-like polymer include butadiene-based cross-linked polymers, (meth)acrylic cross-linked polymers, and organosiloxane-based cross-linked polymers. Among them, (meth)acrylic cross-linked polymers ((meth)acrylic rubber-like polymer) are particularly preferred in terms of the weather resistance (light resistance) and transparency of the composition and the film.

Hereinbelow, a (meth)acrylic cross-linked polymer layer will be described in detail as a preferred "soft" cross-linked polymer layer.

A (meth)acrylic cross-linked polymer in the (meth)acrylic cross-linked polymer layer is not particularly limited as long as it is a (meth)acrylic cross-linked polymer, but is preferably one obtained by polymerization of 50 to 100 wt. % of acrylic ester, 50 to 0 wt. % of another monofunctional monomer copolymerizable with the acrylic ester, and 0.05 to 10 parts by weight of a polyfunctional monomer (per 100 parts by weight of the total amount of the acrylic ester and the another monofunctional monomer copolymerizable therewith) from the viewpoint of impact resistance such as crack resistance. The (meth)acrylic cross-linked polymer layer may be a layer obtained by one-step polymerization performed by mixing all the monomer components or a layer obtained by polymerization performed in two or more steps while changing the composition of monomers.

The acrylic ester used here is preferably alkyl acrylate, specifically one whose alkyl group has 1 to 12 carbon atoms from the viewpoint of polymerization reactivity and cost, and the alkyl group may be either linear or branched. Specific examples of the acrylic ester include methyl acrylate, ethyl acrylate, propyl acrylate, n-butyl acrylate, isobutyl acrylate, t-butyl acrylate, 2-ethylhexyl acrylate, benzyl acrylate, n-octyl acrylate, β-hydroxyethyl acrylate, dimethylaminoethyl acrylate, and glycidyl acrylate, and these monomers may be used singly or in combination of two or more of them. The amount of the acrylic ester is preferably 50 to 100 wt. %, more preferably 60 to 100 wt. %, most preferably 70 to 100 wt. % with respect to the total amount of the monofunctional monomers (with respect to the total amount of the acrylic ester and the another monofunctional monomer copolymerizable therewith). If the amount of the acrylic ester is less than 50 wt. %, there is a case where the crack resistance of the film is deteriorated.

As an example of the another monofunctional monomer copolymerizable with the acrylic ester (hereinafter, sometimes referred to as "another copolymerizable monofunctional monomer"), methacrylic ester can be mentioned. From the viewpoint of polymerizability and cost, alkyl methacrylate is preferable, and to be specific, alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate. Other examples of the another copolymerizable monofunctional monomer include: vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

The above described monofunctional monomer is copolymerized with the polyfunctional monomer having two or more non-conjugated reactive double bonds per molecule, and as a result, a cross-linked polymer (rubber) is obtained. Examples of the polyfunctional monomer used here include allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used in combination of two or more of them.

The amount of the polyfunctional monomer to be added to the monofunctional monomers is preferably 0.05 to 10 parts by weight, more preferably 0.1 to 5 parts by weight per 100 parts by weight of the total amount of the monofunctional monomers. If the amount of the polyfunctional monomer to be added is less than 0.05 part by weight, formation of a cross-linked polymer tends to be impossible. On the other hand, if the amount of the polyfunctional monomer to be added exceeds 10 parts by weight, the film tends to have low crack resistance.

2. Description of "Hard" Polymer Layer

Hereinbelow, the "hard" polymer layer will be described. As described above, the term "hard" means that the polymer has a glass transition temperature of 20° C. or higher.

The hard polymer is not particularly limited as long as its glass transition temperature is 20° C. or higher, and more specifically, the hard polymer can be appropriately formed using the monomer described above with reference to the "soft" cross-linked polymer layer.

Hereinbelow, the polymer composition of the hard polymer will be described in detail.

The composition of the hard polymer is not especially limited as long as the mechanical strength and the heat resistance are improved, and the dispersibility of the multi-layered particles in the resin is improved to reduce appearance defects such as fish-eyes (i.e., as long as the miscibility is increased). One example of the hard polymer is a hard polymer obtained by polymerization of a mixture of (meth) acrylic ester and another monofunctional monomer copolymerizable therewith if necessary. Methyl methacrylate, ethyl methacrylate, butyl methacrylate, or the like can be used as the methacrylic ester, and methyl methacrylate is most preferable. Methyl acrylate, ethyl acrylate, butyl acrylate, or the like can be used as the acrylic ester. As another copolymerizable vinyl monomer, a publicly known monomer such as an aromatic vinyl monomer (styrene, for example) or a vinyl cyanide monomer (acrylonitrile, for example) can be used.

When the orientation birefringence of a molded body such as a film is not so high and therefore does not become an issue, such as when a molded body is not subjected to a stretching process, the cancel-out of the birefringence of the thermoplastic resin (matrix resin) and the increase in the optical isotropy of the thermoplastic resin composition and its molded body can be achieved by allowing the photoelastic constant of the hard polymer to be opposite in sign to that of the matrix (resin (A)) so that the molded body has a very small photoelastic constant. On the other hand, when the orientation birefringence of a molded body such as a film is relatively large and therefore becomes an issue, such as when a molded body is subjected to a stretching process, the cancel-out of the birefringence of the thermoplastic resin (matrix resin) and the increase in the optical isotropy of the thermoplastic resin composition and its molded body can be achieved by allowing both the photoelastic constant and orientation birefringence of the hard polymer to be opposite in sign to those of the matrix resin (thermoplastic resin) so that not only the photoelastic constant of the molded body but also the orientation birefringence of the molded body is very low.

What is more important is that the hard polymer layer is more effective than the polymer layer having a cross-linked structure at cancelling out the birefringence of the thermoplastic resin as a matrix resin. Any one or more of the layers of the rubber particles, for example one or both of the cross-linked polymer layer and the hard polymer layer of the rubber particle, may have the function of cancelling out the birefringence of the rubber particle, but the hard polymer layer is most preferred. The reason for this is considered to be that when polymer orientation occurs during molding of the matrix (thermoplastic resin) or polymer orientation occurs by the application of stress to the matrix (thermoplastic resin), the birefringence of the matrix can be cancelled out by orienting the polymer chains of the rubber particles in a direction in which the polymer chains of the matrix are oriented by external force. In this case, the polymer layer having a cross-linked structure is less likely to be deformed by external force and therefore polymer chains are less likely to be oriented, that is, the polymer layer having a cross-linked structure is less effective at cancelling out the birefringence of the matrix. Of course, when the crosslink density of the polymer layer having a cross-linked structure is low, the polymer layer having a cross-linked structure is likely to be deformed by external force, and therefore the polymer layer having a cross-linked structure is also expected to be effective to some extent at cancelling out the birefringence of the matrix. For this reason, any of the polymer layers, including the cross-linked polymer layer, of the graft copolymer may have the function of cancelling out the birefringence of the matrix, but the polymer layer other than the cross-linked polymer layer or the polymer layer in which polymer chains can be oriented by external force is preferred, and more specifically the "hard" polymer layer is preferred. The "hard" polymer layer having no cross-linked structure is more preferred, and the "hard" polymer layer that is present as an outer layer of the polymer (B) so as to easily come into direct contact with the matrix and that has no cross-linked structure is even more preferred.

A monomer species that is used for forming the hard polymer layer of the rubber particle and is suitable for cancelling out the photoelastic birefringence of the thermoplastic resin shall be selected so that the photoelastic constant of the thermoplastic resin and the photoelastic constant of the rubber particle are opposite in sign to each other.

Specific examples of a monomer are given below as a reference for setting the photoelastic constant of a polymer, but the monomer species is not limited thereto (a value within [ ] represents the photoelastic constant of its homopolymer).

Monomers Showing Positive Photoelastic Birefringence:

| | |
|---|---|
| Benzyl methacrylate | $[48.4 \times 10^{-12} \text{ Pa}^{-1}]$ |
| Dicyclopentanyl methacrylate | $[6.7 \times 10^{-12} \text{ Pa}^{-1}]$ |
| Styrene | $[10.1 \times 10^{-12} \text{ Pa}^{-1}]$ |
| Parachlorostyrene | $[29.0 \times 10^{-12} \text{ Pa}^{-1}]$ |

Monomers Showing Negative Photoelastic Birefringence:

| | |
|---|---|
| Methyl methacrylate | $[-4.3 \times 10^{-12} \text{ Pa}^{-1}]$ |
| 2,2,2-trifluoroethyl methacrylate | $[-1.7 \times 10^{-12} \text{ Pa}^{-1}]$ |
| 2,2,2-trichloroethyl methacrylate | $[-10.2 \times 10^{-12} \text{ Pa}^{-1}]$ |
| Isobornyl methacrylate | $[-5.8 \times 10^{-12} \text{ Pa}^{-1}]$ |

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence becomes substantially zero when the ratio of poly-MMA/BzMA is 92/8 (wt. %). The same applies to a mixture (alloy) of two or more polymers, that is, additivity is established between the photoelastic constant of a polymer mixture and the photoelastic constants of polymers. This is why it is necessary to allow the photoelastic constant of the thermoplastic resin and the rubber particle to be opposite in sign and to adjust the amounts (wt. %) of the thermoplastic resin and the rubber particle to be blended to reduce the photoelastic birefringences of the thermoplastic resin composition and the film according to one or more embodiments of the present invention.

Further, it is known that additivity is established between the orientation birefringence of a copolymer and the intrinsic birefringences of homopolymers corresponding to monomer species used for copolymerization. The same applies to a mixture (alloy) of two or more polymers, that is, additivity is established between the orientation birefringence of a polymer mixture and the intrinsic birefringences of polymers. The monomer species that is used for forming the hard polymer layer of the rubber particle and is suitable for cancelling out the orientation birefringence of the thermoplastic resin shall be selected so that the orientation birefringence of the thermoplastic resin and the orientation birefringence of the rubber particle are opposite in sign. Specific examples of a monomer are given below as a reference for setting the orientation birefringence of a polymer (a value within [ ] represents the intrinsic birefringence of a homopolymer consisting of the monomer), but the monomer species is not limited thereto. It is to be noted that the term "intrinsic birefringence" refers to birefringence (orientation birefringence) when a polymer is completely oriented in one direction.

Polymers Showing Positive Intrinsic Birefringence:

| | |
|---|---|
| Polybenzyl methacrylate | [+0.002] |
| Polyphenylene oxide | [+0.210] |
| Bisphenol A polycarbonate | [+0.106] |
| Polyvinyl chloride | [+0.027] |
| Polyethylene terephthalate | [+0.105] |
| Polyethylene | [+0.044] |

Polymers Showing Negative Intrinsic Birefringence:

| Polymethyl methacrylate | [−0.0043] |
| Polystyrene | [−0.100] |

Although the data of photoelastic constants and orientation birefringences of some polymers is shown above, both the birefringences are not always the same in sign depending on the type of polymer. For example, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
|---|---|---|
| Polymethyl methacrylate (MMA) | Negative | Negative |
| Poly(2,2,2-trifluoroethyl methacrylate) (3FMA) | Positive | Negative |
| Polybenzyl methacrylate (BzMA) | Positive | Positive |

For example, it is known that the orientation birefringence of a poly(MMA/BzMA) copolymer having a composition of around 82/18 (wt. %) is substantially zero and that the photoelastic birefringence (constant) of a poly(MMA/BzMA) copolymer having a composition of around 92/8 (wt. %) is substantially zero. As shown above, when the thermoplastic resin is an acrylic resin, both the orientation birefringence and the photoelastic constant thereof are often negative, and therefore benzyl methacrylate whose orientation birefringence and photoelastic birefringence are both positive is suitable for use in the rubber particle (especially, in the hard polymer layer that is the outer layer of the rubber particle) because the orientation birefringence of the thermoplastic resin can be cancelled out while the photoelastic birefringence of the thermoplastic resin is also cancelled out.

Hereinbelow, the polymer composition of the hard polymer will be described in detail.

Monomers especially preferably used from the viewpoint of cancelling out the photoelastic birefringence of the matrix resin, if necessary, the orientation birefringence of the matrix resin, are preferably vinyl-based monomers (hereinafter may be referred to as "ring structure-containing vinyl-based monomers") having a ring structure, such as an alicyclic structure, a heterocyclic structure, or an aromatic group, in their molecular structure. Among them, vinyl-based monomers having alicyclic structure, heterocyclic structure, or aromatic group are more preferable. When the monomer is a vinyl-based monomer having an alicyclic structure, the ring structure is preferably a polycyclic structure, more preferably a condensed-ring structure. Examples of the monomer having an alicyclic structure include dicyclopentanyl(meth)acrylate and dicyclopentenyloxyethyl(meth)acrylate. Examples of the monomer having an aromatic group include vinyl arenes such as styrene, α-methylstyrene, monochlorostyrene, and dichlorostyrene, benzyl(meth)acrylate, phenyl(meth)acrylate, and phenoxyethyl(meth)acrylate. Examples of the monomer having a heterocyclic structure include pentamethylpiperidinyl(meth)acrylate, tetramethylpiperidinyl(meth)acrylate, and tetrahydrofurfuryl(meth)acrylate. Among them, it is preferable that the monomer represented by Formula (4) below be contained as a structural unit.

[Chemical Formula 14]

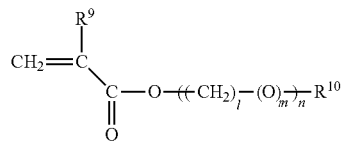

(4)

wherein $R^9$ is a hydrogen atom or a substituted or unsubstituted linear or branched alkyl group having 1 to 12 carbon atoms, and $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure. A substituent group that $R^9$ and $R^{10}$ may have is, for example, at least one selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Particularly, at least one selected from the group consisting of a halogen, a hydroxyl group, a carboxyl group, an alkoxy group, and a nitro group is preferred. In the above formula (4), 1 is an integer of 1 to 4, preferably an integer of 1 or 2, m is an integer of 0 or 1, and n is an integer of 0 to 10, preferably an integer of 0 to 2, more preferably an integer of 0 or 1.

The vinyl-based monomer having an alicyclic structure, a heterocyclic structure, or an aromatic group is preferably a (meth)acrylic monomer having an alicyclic structure, a heterocyclic structure, or an aromatic group. More specifically, the vinyl-based monomer is preferably a (meth)acrylic monomer represented by the formula (4) wherein $R^9$ is a hydrogen atom or a substituted or unsubstituted alkyl group having 1 carbon atom, and is more preferably a (meth)acrylic monomer represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

A (meth)acrylic monomer represented by the formula (4) wherein 1 is an integer of 1 or 2 and n is an integer of 0 to 2 is more preferred.

Among (meth)acrylic monomers represented by the formula (4), benzyl(meth)acrylate, dicyclopentanyl(meth)acrylate, and phenoxyethyl(meth)acrylate are preferred.

Among these monomers represented by the formula (4), benzyl(meth)acrylate is most preferred in terms of optical isotropy, miscibility with the matrix resin, and moldability. Further, benzyl methacrylate is more preferable than benzyl acrylate in terms of heat resistance since the glass transition temperature of each of the multi-layered particle and the acrylic resin composition obtained by copolymerization of benzyl methacrylate becomes high. For example, since the acrylic resin that is the matrix resin used in one or more embodiments of the present invention has a negative photoelastic constant, the use of benzyl methacrylate having a relatively large positive photoelastic constant has merits that the amount of benzyl methacrylate to be used can be reduced or the amount of the multi-layered particles to be used can be reduced and that the degree of freedom of design of the acrylic resin composition can be increased. Although there is a case where high orientation birefringence of a molded body becomes an issue when the molded body is practically used, the orientation birefringence and photoelastic birefringence of benzyl methacrylate are both positive whereas the orientation birefringence and photoelastic birefringence of an acrylic resin are both negative, and therefore the orientation birefringence of the acrylic resin composition or the film can be reduced while the photoelastic birefringence of the acrylic resin composition or the film is also reduced.

From the viewpoint of achieving excellent dispersibility of the multi-layered particle to reduce appearance defects such as fish-eyes while maintaining excellent optical isotropy, the hard polymer having the ring structure-containing vinyl-based monomer as a structural unit is preferably one obtained by polymerization of 1 to 100 wt. % of the ring structure-containing vinyl-based monomer, 99 to 0 wt. % of another monofunctional monomer copolymerizable therewith, and 0 to 2.0 parts by weight of a polyfunctional monomer (per 100 parts by weight of the total amount of the ring structure-containing vinyl-based monomer and the another monofunctional monomer copolymerizable therewith). The hard polymer layer may be one obtained by one-step polymerization performed by mixing all the monomers or one obtained by polymerization performed in two or more steps by changing the composition of monomers.

In one or more embodiments of the present invention, any one of the ring structure-containing vinyl-based monomers may be used, or two or more of the ring structure-containing vinyl-based monomers may be used in combination.

As an example of the another monofunctional monomer copolymerizable with the ring structure-containing vinyl-based monomer, methacrylic ester can be mentioned. From the viewpoint of polymerizability or cost, alkyl methacrylate is preferable, and to be specific, alkyl methacrylate is preferably one whose alkyl group has 1 to 12 carbon atoms, and the alkyl group may be either linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, acrylic ester may also be preferably used. From the viewpoint of polymerization reactivity or cost, alkyl acrylate is preferable, and to be specific, alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the another copolymerizable monofunctional monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylic esters such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Among them, alkyl methacrylates and alkyl acrylates are preferred. Further, methyl methacrylate is preferred from the viewpoint of miscibility with the matrix resin, and methyl acrylate, ethyl acrylate, or n-butyl acrylate is preferred from the viewpoint of suppressing zipper depolymerization.

From the viewpoint of the improvement in heat stability during molding process, the improvement in solvent resistance, and the improvement in dispersibility of the multi-layered particle, it is preferable to use (meth)acrylic acid and/or its salt. Examples of the salt of (meth)acrylic acid includes sodium(meth)acrylate, calcium(meth)acrylate, magnesium(meth)acrylate, and ammonium(meth)acrylate.

The amount of (meth)acrylic acid and/or its salt to be used is preferably 0.1 to 30 wt. %, more preferably 0.1 to 20 wt. %, further preferably 0.1 to 15 wt. %, yet further preferably 0.1 to 10 wt. %, and most preferably 0.1 to 7 wt. % per 100 wt. % of the total amount of the monofunctional monomers.

Since a structure derived from (meth)acrylic acid and/or its salt exists in the hard polymer layer, a carboxyl group of the (meth)acrylic acid and an alkyl group of a (meth)acrylic acid derivative that exists next to the (meth)acrylic acid are cyclized by removing alkyl alcohol during molding process, and thus, an acid anhydride structure is formed. For example, if methyl(meth)acrylate exists next to the (meth)acrylic acid, a methanol removal reaction occurs, and thus, an acid anhydride structure is formed. Further, if benzil (meth)acrylate exists next to the (meth)acrylic acid, a benzyl alcohol removal reaction occurs, and thus, an acid anhydride structure is formed. Even in the case of the salt of the (meth)acrylic acid, the carboxyl group derived from the (meth)acrylic acid may form a salt in a below-described salt solidification treatment under high temperature conditions during molding process. Even in such a case, a free acid may be dissociated. Therefore, the structure derived from the (meth)acrylic acid and/or its salt may be a free acid or a salt, such as magnesium salt, calcium salt, or ammonium salt.

The ratio at which (meth)acrylic acid structural units are converted to anhydride structures changes depending on heat history such as processing conditions, and all the (meth)acrylic acid structural units do not necessarily have to be converted to acid anhydride structures, and the degree of cyclization may be arbitrarily adjusted depending on desired characteristics.

From the viewpoint of the improvements in optical isotropy, heat stability, solvent resistance, and dispersibility of the multi-layered particle, it is preferable to include the hard polymer layer containing the ring structure-containing vinyl-based monomer and the (meth)acrylic acid and/or its salt as the structural units.

The amount of the ring structure-containing vinyl-based monomer to be used is preferably 1 to 100 wt. %, more preferably 5 to 70 wt. %, and most preferably 5 to 50 wt. % with respect to 100 wt. % of the total amount of the monofunctional monomers (the total amount of the ring structure-containing vinyl-based monomer and another monofunctional monomer copolymerizable therewith).

It is to be noted that the hard polymer layer may use a polyfunctional monomer having two or more non-conjugated reactive double bonds per molecule. Here, the polyfunctional monomer to be used may be the same as the polyfunctional monomer that can be used for the cross-linked polymer layer. From the viewpoint of optical isotropy and dispersibility, the amount of the polyfunctional monomer to be used for the hard polymer layer is preferably 0 to 2.0 parts by weight, more preferably 0 to 1.0 part by weight, more preferably 0 to 0.5 part by weight, even more preferably 0 to 0.04 part by weight, most preferably 0 part by weight (per 100 parts by weight of the total amount of the monofunctional monomer).

The multi-layered particle preferably has a hard polymer layer having, as a structural unit, the ring structure-containing vinyl-based monomer in its multi-layered structure. When the multi-layered particle has a hard outermost layer, the multi-layered particle more preferably has a hard polymer layer having, as structural units, the ring structure-containing vinyl-based monomer and/or the (meth)acrylic acid and/or its salt as the outermost layer. By allowing the multi-layered particle to have a hard outermost layer, it is possible to allow the multi-layered particle to be more miscible with the matrix resin, further reduce orientation birefringence and photoelastic constant, and easily obtain a film having excellent optical isotropy. A soft layer having a (meth)acrylic cross-linked polymer layer ((meth)acrylic rubber) may be adjacent to the inner side of the hard outermost layer.

The multi-layered particle is preferably a multi-layered polymer having at least one (meth)acrylic cross-linked polymer layer and at least one hard polymer layer. From the viewpoint of optical characteristics, it is more preferable that at least one of the hard polymer layers includes the ring structure-containing vinyl-based monomer and/or the (meth) acrylic acid and/or its salt as structural units. A preferred example of the multi-layered particle is one that has a soft inner layer having a (meth)acrylic cross-linked polymer layer and a hard outer layer having a hard polymer layer having, as a structural unit, a monomer represented by the above formula (4) and/or (meth)acrylic acid and/or its salt. This example is preferred from the viewpoint of productivity. Another preferred example of the multi-layered particle is one that has a hard inner layer composed of at least one hard polymer layer, a soft intermediate layer having a soft polymer layer composed of a (meth)acrylic cross-linked polymer layer, and a hard outer layer having a hard polymer layer having, as structural units, the monomer represented by the above formula (4) and/or (meth)acrylic acid and/or its salt. This example may further have a soft innermost layer. In one or more embodiments of the present invention, they may be appropriately used singly or in combination of two or more of them.

In this specification, the terms "soft inner layer", "soft intermediate layer", and "soft layer" (hereinafter, referred to as "soft layer") refer to an inner layer, an intermediate layer, and a layer composed of at least one soft polymer, respectively.

On the other hand, in this specification, the terms "hard outer(most) layer" and "hard inner layer" refer to an outer (most) layer and an inner layer composed of at least one hard polymer, respectively. It is to be noted that the terms "soft" and "hard" here are the same as those described above.

When the multi-layered particle has a hard layer as an innermost layer, for example, when the multi-layered particle has a multi-layered structure composed of a hard inner layer, a soft intermediate layer, and a hard outer layer, the innermost layer is preferably made of, for example, a hard polymer composed of 40 to 100 wt. % of methacrylate, 0 to 60 wt. % of acrylate, 0 to 60 wt. % of an aromatic vinyl-based monomer, 0 to 10 wt. % of a polyfunctional monomer, and 0 to 20 wt. % of another monofunctional monomer copolymerizable with the methacrylate, the acrylate, and the aromatic vinyl-based monomer from the viewpoint of a balance between hardness and crack resistance.

When the multi-layered particle has a multi-layered structure composed of, for example, a soft inner layer having a (meth)acrylic cross-linked polymer layer and a hard outer layer having a polymer layer having, as a structural unit, the monomer represented by the above formula (4), a layer structure is generally formed in which the soft inner layer is completely covered with the outer hard polymer layer. However, depending on, for example, the weight ratio between the soft inner layer and the hard outer layer, there is a case where the amount of the hard polymer is not sufficient for forming such a layer structure. In this case, the layer structure does not always need to be complete, and a structure in which part of the soft inner layer is covered with the hard polymer as an outer part or a structure in which the hard polymer as an outer part is graft-polymerized with part of the soft inner layer may also be appropriately used. It is to be noted that the same applies to other examples of the multi-layered particle.

The volume-average particle diameter to the cross-linked polymer layer of the multi-layered particle is preferably 20 to 450 nm, more preferably 20 to 300 nm, even more preferably 20 to 150 nm, most preferably 30 to 80 nm. If the volume-average particle diameter is less than 20 nm, there is a case where crack resistance is deteriorated. On the other hand, if the volume-average particle diameter exceeds 450 nm, there is a case where transparency is deteriorated. Further, from the viewpoint of resistance to whitening on bending, the volume-average particle diameter is preferably less than 80 nm. Further, from the viewpoint of trimming property, the volume-average particle diameter is preferably 20 to 450 nm, more preferably 50 to 450 nm, even more preferably 60 to 450 nm, even more preferably 100 to 450 nm. It is to be noted that the volume-average particle diameter can be measured by a dynamic scattering method using, for example, MICROTRAC UPA150 (manufactured by NIKKISO CO., LTD.). More specifically, the volume-average particle diameter to the cross-linked polymer layer of the multi-layered particle refers to the volume-average particle diameter of particles formed from the center of the multi-layered particles to the cross-linked polymer layer. When the multi-layered particle has two or more cross-linked polymer layers, the average-volume particle diameter to the cross-linked polymer layer of the multi-layered particle refers to a volume-average particle diameter to the cross-linked polymer layer farthest from the center of the multi-layered particle.

The cross-linked polymer content of the multi-layered particle is preferably 10 to 90 wt. %, more preferably 20 to 80 wt. %, even more preferably 30 to 60 wt. %, most preferably 35 to 55 wt. % when the amount of the multi-layered particle is taken as 100 wt. %. If the cross-linked polymer content is less than 10 wt. %, there is a case where a resulting acrylic resin composition has low mechanical strength such as crack resistance. On the other hand, if the cross-linked polymer content exceeds 90 wt. %, the dispersibility of the multi-layered particle is impaired and a resulting molded body cannot have a smooth surface, which tends to cause appearance defects such as fish-eyes. Further, the hard polymer content is not sufficient, which tends to increase orientation birefringence or photoelastic constant so that optical isotropy cannot be maintained.

A method for producing the multi-layered particle is not particularly limited, and a known emulsion polymerization method, emulsion-suspension polymerization method, suspension polymerization method, bulk polymerization method, or solution polymerization method can be used. However, the multi-layered particle is particularly preferably produced by an emulsion polymerization method.

The multi-layered particle is preferably obtained by multistep polymerization. For example, a (meth)acrylic rubber-containing graft copolymer obtained by multistep polymerization can be preferably used as the multi-layered particle, which is obtained by performing, as at least one of the steps of the multistep polymerization, polymerization of a mixture containing the ring structure-containing vinyl-based monomer and/or (meth)acrylic acid and/or its salt in the presence of (meth)acrylic rubber-containing polymer particles. It is more preferable that in the (meth)acrylic rubber-containing graft copolymer, the monomer represented by the formula (4) be used as the ring structure-containing vinyl-based monomer. In addition to the ring structure-containing vinyl-based monomer and the (meth)acrylic acid and/or its salt, the mixture may contain another monofunctional monomer copolymerizable therewith or may contain a polyfunctional monomer.

By polymerization of the mixture, the hard polymer having the ring structure-containing vinyl-based monomer and/or the (meth)acrylic acid and/or its salt as the structural units is formed. Examples of the ring structure-containing vinyl-based monomer, the (meth)acrylic acid and/or its salt, the another monofunctional monomer copolymerizable therewith are the same as those mentioned above. Further, these examples can be preferably used, and the contents are also the same as those mentioned above. Examples of the polyfunctional monomer are the same as those mentioned above, and these examples can be preferably used.

The (meth)acrylic rubber-containing polymer particles shall be polymer particles obtained by multistep polymerization and containing at least (meth)acrylic rubber. The (meth)acrylic rubber-containing polymer particles preferably have a rubber ((meth)acrylic cross-linked polymer) part obtained by polymerization of 50 to 100 wt. % of acrylic ester, 50 to 0 wt. % of another monofunctional monomer copolymerizable with the acrylic ester, and 0.05 to 10 parts by weight of a polyfunctional monomer (per 100 parts by weight of the total amount of the acrylic ester and the another monofunctional monomer copolymerizable therewith). The rubber part may be obtained by one-step polymerization performed by mixing all the monomer components or by polymerization performed in two or more steps by changing the composition of monomers.

The (meth)acrylic rubber-containing polymer particles are not particularly limited as long as a (meth)acrylic cross-linked polymer (rubber part) is formed in at least one of the steps of multistep polymerization, and polymerization for forming a hard polymer may be performed before and/or after the polymerization for forming a (meth)acrylic cross-linked polymer.

Particularly, from the viewpoint of productivity, a preferable example of the multi-layered particle is a (meth) acrylic rubber-containing graft copolymer obtained by (b-1) polymerization of a monomer mixture of 50 to 100 wt. % of acrylic ester, 50 to 0 wt. % of another monofunctional monomer copolymerizable therewith, and 0.05 to 10 parts by weight of a polyfunctional monomer (per 100 parts by weight of the total amount of the acrylic ester and the another monofunctional monomer copolymerizable therewith) to obtain a (meth)acrylic rubber-containing polymer particles and then by (b-2) polymerization of a monomer mixture of 1 to 100 wt. % of the ring structure-containing vinyl-based monomer, 99 to 0 wt. % of another monofunctional monomer copolymerizable therewith, and 0 to 2.0 parts by weight of a polyfunctional monomer (per 100 parts by weight of the total amount of the ring structure-containing vinyl-based monomer and the another monofunctional monomer copolymerizable therewith) in the presence of the above (meth)acrylic rubber-containing polymer particles or polymerization of a monomer mixture of 1 to 99.9 wt. % of the ring structure-containing vinyl-based monomer, 0.1 to 30 wt. % of the (meth)acrylic acid and/or its salt, 98.9 to 0 wt. % of another monofunctional monomer copolymerizable therewith, and 0 to 2.0 parts by weight of a polyfunctional monomer (per 100 parts by weight of the total amount of the ring structure-containing vinyl-based monomer, the (meth) acrylic acid and/or its salt, and the another monofunctional monomer copolymerizable therewith). Here, the polymerization of the monomer mixture in the step (b-1) and/or the polymerization of the monomer mixture in the step (b-2) may be performed in one step by mixing all the monomer components or in two or more steps by changing the composition of monomers. Further, examples of the acrylic ester, the another monofunctional monomer copolymerizable therewith, and the polyfunctional monomer used in the step (b-1) and preferred amounts thereof to be used are the same as those described above with reference to the (meth) acrylic cross-linked polymer. Examples of the components of the monomer mixture used in the step (b-2) and preferred amounts thereof to be used are the same as those described above with reference to the hard polymer layer.

The volume-average particle diameter to the (meth) acrylic rubber layer of the (meth)acrylic rubber-containing graft copolymer is measured in the same manner as the volume-average particle diameter to the (meth)acrylic cross-linked polymer layer of the multi-layered particle, and the preferred range thereof is also the same as that of the multi-layered particle.

When the multi-layered particle is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphates such as sodium polyoxyethylene lauryl ether phosphate and nonionic surfactants such as reaction products of alkyl phenols or aliphatic alcohols and propylene oxide or ethylene oxide. These surfactants may be used singly or in combination of two or more of them. Further, if necessary, a cationic surfactant such as an alkylamine salt may be used. Among them, a phosphate (alkali metal or alkaline earth metal) such as sodium polyoxyethylene lauryl ether phosphate is particularly preferably used for polymerization from the viewpoint of improving the heat stability of a resulting multi-layered particle.

When the multi-layered particle is produced by emulsion polymerization in such a manner, a so-called latex is obtained in which primary particles of the multi-layered particle are emulsified and dispersed in an aqueous phase. Such a multi-layered polymer latex of the multi-layered particle often contains polymer particles or polymer blocks that are called scale and produced as a by-product in the step of multilayer polymerization for forming particles of the multi-layered particle. The polymer particles or polymer blocks have a larger particle diameter and often partially or entirely have a cross-linked structure. Further, there is a case where foreign matter containing inorganic substances or dust contained in a vapor phase or water is mixed into the latex from the outside environment in the polymerization step. Mixing of the scale or foreign matter into the acrylic resin composition according to one or more embodiments of the present invention is undesirable because the scale or foreign matter causes optical defects in a resulting film. For this reason, for the purpose of reducing or removing the scale or foreign matter, the multi-layered polymer latex of the multi-layered particle is preferably filtered through a mesh or filter. As the mesh or filter used for filtration, a widely-known one proposed for the purpose of filtering a liquid material can be used. The type, pore size, filter capacity, etc. of the mesh or filter may be appropriately selected depending on the size or desired removal rate of polymer scale produced as a by-product or foreign matter mixed into the latex as long as primary particles of the multi-layered particle can pass through the pores of the mesh or filter.

A multi-layered polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to obtain a powdered multi-layered polymer. When the polymer latex is coagulated to obtain a multi-layered polymer, a known coagulant such as an acid or a salt can be used, but a magnesium salt, especially magnesium sulfate, is particularly preferably used as a coagulant from the viewpoint of improving heat stability during molding of a resulting copolymer.

The multi-layered particle is blended so that the amount of the cross-linked polymer contained in the multi-layered particle is preferably 1 to 60 parts by weight, more preferably 1 to 30 parts by weight, even more preferably 1 to 25 parts by weight per 100 parts by weight of the acrylic resin composition. If the amount of the cross-linked polymer is less than 1 part by weight, there is a case where the crack resistance or vacuum moldability of the film is deteriorated or the film has poor optical isotropy due to an increase in photoelastic constant. On the other hand, if the amount of the cross-linked polymer exceeds 60 parts by weight, the heat resistance, surface hardness, transparency, or resistance to whitening on bending of the film tends to be deteriorated.

The ratio between the matrix resin and the multi-layered particle to be blended is not particularly limited as long as the above-described requirement for blending is satisfied. Depending on the amount of the cross-linked polymer contained in the multi-layered particle, the amount of the multi-layered particle to be blended is preferably 1 to 99 wt. %, more preferably 1 to 80 wt. %, even more preferably 1 to 60 wt. % when the total amount of the matrix resin and the multi-layered particle is taken as 100 wt. %. If the amount of the multi-layered particle to be blended is less than 1 wt. %, there is a case where the crack resistance or vacuum moldability of the film is deteriorated or the film has poor optical isotropy due to an increase in photoelastic constant. On the other hand, if the amount of the multi-layered particle to be blended exceeds 99 wt. %, the heat resistance, surface hardness, transparency, or resistance to whitening on bending of the film tends to be deteriorated.

If necessary, the thermoplastic resin composition according to one or more embodiments of the present invention may be blended with birefringent inorganic microparticles described in Japanese Patent No. 3648201 or Japanese Patent No. 4336586 or a birefringent low-molecular compound having a molecular weight of 5,000 or less, preferably 1,000 or less described in Japanese Patent No. 3696649 to adjust orientation birefringence.

Further, the thermoplastic resin composition according to one or more embodiments of the present invention shall contain at least one type of thermoplastic resin and at least one type of rubber particle, and one or more types of other resins may be added thereto without any particular limitation. Examples of the other resins include other thermoplastic resins, multi-layered polymers such as core-shell polymers and graft copolymers, and thermoplastic elastomers such as block polymers.

One or two or more of an antioxidant, a ultraviolet absorber, a ultraviolet stabilizer, and the like for improving stability against heat or light may be added to the thermoplastic resin composition of one or more embodiments of the present invention.

The thermoplastic resin composition according to one or more embodiments of the present invention may be subjected to molding, such as extrusion molding, injection molding, compression molding, blow molding, or spinning molding, on heating directly in the form of particles or after pelletization using an extruder to obtain a molded article having a shape suitable for its intended use. The thermoplastic resin composition according to one or more embodiments of the present invention is particularly useful as a film, and is successfully processed by, for example, a conventional melt extrusion method such as an inflation method or a T-die extrusion method, a calendering method, or a solvent casting method. Among them, a melt extrusion method using no solvents is particularly preferred since the die line can be suppressed.

From the viewpoint of obtaining a molded body that does not exhibit birefringence resulting from molding processing and can be practically used, the value of orientation birefringence of the thermoplastic resin composition according to one or more embodiments of the present invention is preferably $-15 \times 10^{-4}$ to $15 \times 10^{-4}$, more preferably $-10 \times 10^{-4}$ to $10 \times 10^{-4}$, even more preferably $-5 \times 10^{-4}$ to $5 \times 10^{-4}$. Further, from the viewpoint of obtaining stable optical characteristics, the value of orientation birefringence of the thermoplastic resin composition according to one or more embodiments of the present invention is preferably $-1.7 \times 10^{-4}$ to $1.7 \times 10^{-4}$, more preferably $-1.6 \times 10^{-4}$ to $1.6 \times 10^{-4}$, even more preferably $-1.5 \times 10^{-4}$ to $1.5 \times 10^{-4}$, particularly preferably $-1.0 \times 10^{-4}$ to $1.0 \times 10^{-4}$, more particularly preferably $-0.5 \times 10^{-4}$ to $0.5 \times 10^{-4}$, and most preferably $-0.2 \times 10^{-4}$ to $0.2 \times 10^{-4}$.

From the viewpoint of obtaining a molded body whose birefringence resulting from the application of stress in an environment of, for example, high temperature and high humidity is low, the photoelastic constant of the thermoplastic resin composition according to one or more embodiments of the present invention is preferably $-10 \times 10^{-12}$ to $10 \times 10^{-12}$, more preferably $-4 \times 10^{-12}$ to $4 \times 10^{-12}$, even more preferably $-2 \times 10^{-12}$ to $2 \times 10^{-12}$, even more preferably $-1.5 \times 10^{-12}$ to $1.5 \times 10^{-12}$, particularly preferably $-1 \times 10^{-12}$ to $1 \times 10^{-12}$, more particularly preferably $-0.5 \times 10^{-12}$ to $0.5 \times 10^{-12}$, most preferably $-0.3 \times 10^{-12}$ to $0.3 \times 10^{-12}$. When the thermoplastic resin composition having a photoelastic constant of $-4 \times 10^{-12}$ to $4 \times 10^{-12}$ is formed into a film and the film is used in a liquid crystal display device, a phase difference variation, a reduction in the contrast of peripheral area of a display screen, and light leakage do not occur.

The film-shaped molten resin ejected from the lip of the T die is cooled by a plurality of cooling rolls. Typically, the T die is arranged such that the molten resin contacts a first casting roll at an extreme upstream side (a side close to the die). Two cooling rolls are generally used. The temperature of the casting roll is preferably 60 to 160° C., more preferably 100 to 150° C. Then, the film is peeled off from the casting roll and is taken up after having passed through a nip roll.

Examples of the method of causing the resin to be adhered to the casting roll include a touch roll method, a nip roll method, a static electricity applying method, an air knife method, a vacuum chamber method, a calendar method, and a sleeve method, and an appropriate method is selected depending on the thickness and intended use of the film. When forming an optical film having low optical distortion, the touch roll method is desirable. Especially, in the touch roll method, it is desirable to use an elastic roll having a metal sleeve and a double cylinder structure. The temperature of the touch roll is preferably 60 to 160° C., more preferably 100 to 150° C.

When the thermoplastic resin composition according to one or more embodiments of the present invention is molded into a film, both surfaces of the film may be brought into contact with (sandwiched between) rolls or metal belts, especially rolls or metal belts heated to a temperature around the glass transition temperature of the film, at the same time, if necessary, so that the film has higher surface properties. Further, the film may be subjected to lamination molding or may be modified by biaxial stretching depending on its intended use.

The thickness of the film produced in one or more embodiments of the present invention is not particularly limited, but is preferably 500 μm or less, more preferably 300 μm or less, particularly preferably 200 μm or less. Further, the thickness of the film produced in one or more embodiments of the present invention is preferably 10 μm or more, more preferably 30 μm or more, even more preferably 50 μm or more, particularly preferably 100 μm or more. The film produced in one or more embodiments of the present invention having a thickness within the above range is advantageous in that the film is less likely to be deformed when subjected to vacuum molding and therefore a deep-drawn portion is less likely to be broken, and can have uniform optical characteristics and excellent transparency. On the other hand, if the thickness of the film exceeds the above upper limit, the film after molding is non-uniformly cooled and therefore tends to have non-uniform optical characteristics. If the thickness of the film is less than the above lower limit, there is a case where the film is difficult to handle.

The film produced in one or more embodiments of the present invention may be stretched to improve strength and film thickness accuracy. Further, selection of optimum stretching conditions makes it easy to produce a film that exhibits substantially no birefringence and substantially no increase in haze and has a small thickness variation.

The stretched film (uniaxially-stretched film or biaxially-stretched film) can be produced by once molding the thermoplastic resin composition according to one or more embodiments of the present invention to form an unstretched film and then by subjecting the unstretched film to uniaxial stretching or biaxial stretching.

The film according to one or more embodiments of the present invention preferably has a haze value of 2.0% or less, more preferably 1.0% or less, even more preferably 0.8% or less, particularly preferably 0.5% or less. When the film according to one or more embodiments of the present invention has a haze value within the above range, its transparency is sufficiently high and therefore the film is suitable for optics applications, decorative applications, interior applications, or vacuum molding applications requiring transparency.

The film according to one or more embodiments of the present invention preferably has a total light transmittance of 85% or higher, more preferably 88% or higher. When the film according to one or more embodiments of the present invention has a total light transmittance within the above range, its transparency is sufficiently high and therefore the film is suitable for optics applications, decorative applications, interior applications, or vacuum molding application requiring transparency.

The film according to one or more embodiments of the present invention preferably has a glass transition temperature of 100° C. or higher, more preferably 115° C. or higher, even more preferably 120° C. or higher, even more preferably 124° C. or higher. When having a glass transition temperature within the above range, the film according to one or more embodiments of the present invention can have sufficiently high heat resistance.

The film according to one or more embodiments of the preset invention preferably has a tensile elongation at breakage of 10% or more, more preferably 20% or more, even more preferably 30% or more, even more preferably 40% or more, particularly preferably 50% or more, more particularly preferably 60% or more, most preferably 90% or more. When having a tensile elongation at breakage within the above range, the film according to one or more embodiments of the present invention is less likely to be cracked when cut out with a Thomson blade or a cutter blade (trimming property) and is less likely to be broken when rolled up or when the surface thereof is subjected to after-processing such as coating, vapor deposition, sputtering, or bonding to a protective film. Further, the film has high crack resistance against bending, and therefore trouble such as cracking does not occur not only when the film is subjected to after-processing but also when the film is practically used as a product. The crack resistance is particularly correlated with tensile elongation at breakage, and a higher tensile elongation at breakage means higher crack resistance.

If necessary, the film obtained by one or more embodiments of the present invention may be used by laminating another film thereon with an adhesive or the like or by forming a coating layer such as a hard coating layer or the like on the surface thereof.

The film obtained by one or more embodiments of the present invention may be laminated on a metal or plastic. Examples of a method for laminating the film include lamination molding, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion molding or laminate injection press molding in which a resin is injected into a mold in which a film is provided and in-mold molding in which a resin is injected into a mold in which a pre-molded film is provided.

An article on which the film obtained by one or more embodiments of the present invention is laminated can be used as, for example, substitutes for paint such as car interior materials and car exterior materials, building materials such as window frames, bathroom fitments, wallpapers, and floor materials, daily goods, housings for furniture or electrical equipment, housings for OA equipment such as facsimiles, laptop computers, and copy machines, front panels of liquid crystal displays of terminal equipment such as mobile phones, smartphones, and tablets, and parts of electric or electronic devices.

The film produced in one or more embodiments of the present invention is not especially limited and can be used as an optical film. Especially, the film produced in one or more embodiments of the present invention can be used as a member used in display devices such as liquid crystal display devices. Examples of such member used in display devices include a polarizing plate protection film, a phase difference film, a luminance improving film, a liquid crystal substrate, a light diffusion sheet, and a prism sheet. Among them, the film produced by one or more embodiments of the present invention is preferably used as the polarizing plate protection film or the phase difference film. A molded article, other than a film, made of the thermoplastic resin composition according to one or more embodiments of the present invention can be used as, for example, lenses such as lenses for common cameras, lenses for video cameras, object lenses, diffraction gratings, holograms, and collimators for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for LCDs, films for LCDs, substrates for LCDs, and adhesives for bonding liquid crystal elements, screens for projectors, optical filters, optical fibers, optical waveguides, prisms, lenses for lighting, car headlights, medical supplies requiring sterilization, microwave cooking vessels, housings for home appliances, toys, and recreation items.

Particularly, when used as a polarizer protective film, the film according to one or more embodiments of the present invention preferably has low optical anisotropy. Particularly, the optical anisotropy of the film is preferably low not only in its in-plane direction (length and width directions) but also in its thickness direction. In other words, both the in-plane phase difference and the absolute value of the thickness-direction phase difference of the film are preferably small. More specifically, the in-plane phase difference (Re) is preferably 10 nm or less, more preferably 6 nm or less, even more preferably 5 nm or less, even more preferably 3 nm or less. The absolute value of the thickness-direction phase difference (Rth) is preferably 50 nm or less, more preferably 20 nm or less, even more preferably 10 nm or less, most preferably 5 nm or less. The film having such a phase difference can be preferably used as a polarizer protective film of a polarizing plate in a liquid crystal display device. On the other hand, if the film having an in-plane phase difference exceeding 10 nm or a thickness-direction phase difference exceeding 50 nm is used as a polarizer protective film of a polarizing plate in a liquid crystal display device, there is a case where a reduction in the contrast of the liquid crystal display device occurs.

The value of orientation birefringence of a molded body made of the thermoplastic resin composition according to one or more embodiments of the present invention is preferably $-15 \times 10^{-4}$ to $15 \times 10^{-4}$, more preferably $-10 \times 10^{-4}$ to $10 \times 10^{-4}$, even more preferably $-5 \times 10^{-4}$ to $5 \times 10^{-4}$, even more preferably $-1.6 \times 10^{-4}$ to $1.6 \times 10^{-4}$, particularly preferably $-1 \times 10^{-4}$ to $1 \times 10^{-4}$, more particularly preferably $-0.5 \times 10^{-4}$ to $0.5 \times 10^{-4}$, most preferably $-0.2 \times 10^{-4}$ to $0.2 \times 10^{-4}$. When the orientation birefringence of the molded body is within the above range, the molded body does not exhibit birefringence resulting from molding processing and therefore can be practically used.

The value of orientation birefringence of a film as the molded body made of the thermoplastic resin composition according to one or more embodiments of the present invention is preferably $-1.7 \times 10^{-4}$ to $1.7 \times 10^{-4}$, more preferably $-1.6 \times 10^{-4}$ to $1.6 \times 10^{-4}$, even more preferably $-1.5 \times 10^{-4}$ to $1.5 \times 10^{-4}$, even more preferably $-1.0 \times 10^{-4}$ to $1.0 \times 10^{-4}$, particularly preferably $-0.5 \times 10^{-4}$ to $0.5 \times 10^{-4}$, most preferably $-0.2 \times 10^{-4}$ to $0.2 \times 10^{-4}$.

A molded body made of the thermoplastic resin composition according to one or more embodiments of the present invention preferably has a photoelastic constant of $-10 \times 10^{-12}$ to $10 \times 10^{-12}$, more preferably $-4 \times 10^{-12}$ to $4 \times 10^{-12}$, even more preferably $-2 \times 10^{-12}$ to $2 \times 10^{-12}$, even more preferably $-1 \times 10^{-12}$ to $1 \times 10^{-12}$, even more preferably $-0.5 \times 10^{-12}$ to $0.5 \times 10^{-12}$, most preferably $-0.3 \times 10^{-12}$ to $0.3 \times 10^{-12}$.

A film made of the thermoplastic resin composition according to one or more embodiments of the present invention preferably has a photoelastic constant of $-4 \times 10^{-12}$ $Pa^{-1}$ to $4 \times 10^{-12}$ $Pa^{-1}$, more preferably $-1.5 \times 10^{-12}$ $Pa^{-1}$ to $1.5 \times 10^{-12}$ $Pa^{-1}$, even more preferably $-1.0 \times 10^{-12}$ $Pa^{-1}$ to $1.0 \times 10^{-12}$ $Pa^{-1}$, even more preferably $-0.5 \times 10^{-12}$ $Pa^{-1}$ to $0.5 \times 10^{-12}$ $Pa^{-1}$, most preferably $-0.3 \times 10^{-12}$ $Pa^{-1}$ to $0.3 \times 10^{-12}$ $Pa^{-1}$.

EXAMPLES

Hereinbelow, the present invention will be described more specifically with reference to examples, but is not limited to these examples. In the following description, "part(s)" and "%" represent "part(s) by weight" and "wt. %", respectively unless otherwise specified.

(Volume-Average Particle Diameter to (Meth)Acrylic Cross-Linked Polymer Layer of Graft Copolymer)

The volume-average particle diameter to the (meth) acrylic cross-linked polymer layer of a graft copolymer (volume-average particle diameter of acrylic rubber particles) was measured using an acrylic rubber particle latex. The measurement of the volume-average particle diameter (μm) was performed using, as a measuring instrument, MICROTRAC UPA150 manufactured by NIKKISO CO., LTD.

(Polymerization Conversion Ratio)

First, part of an obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula, a chain transfer agent was regarded as a monomer charged.

Polymerization conversion ratio (%)=[(total weight of raw materials charged×solid content−total weight of raw materials other than water and monomers)/weight of monomers charged]×100

(Graft Ratio)

Two grams of the polymer (B) obtained was dissolved in 50 mL of methyl ethyl ketone, and the solution was separated into insoluble matter and soluble matter by centrifugation using a centrifugal separator (CP60E manufactured by Hitachi Koki Co., Ltd.) at 30,000 rpm for 1 hour (three sets of centrifugation were performed in total). The thus obtained insoluble matter was used to calculate a graft ratio by the following formula.

Graft ratio (%)={(weight of methyl ethyl ketone insoluble matter−weight of cross-linked polymer layer)/weight of cross-linked polymer layer}×100

It is to be noted that the weight of a cross-linked polymer layer refers to the weight of monofunctional monomers charged and constituting the cross-linked polymer layer.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1,720 $cm^{-1}$ (Absester) and the absorption intensity of imide carbonyl groups at 1,660 $cm^{-1}$ (Absimide) were determined, and the ratio between them was determined as an imidization ratio (Im % (IR)). The term "imidization ratio" used herein refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit (mol %), such as a glutarimide unit or an ester unit, contained in the resin, and the monomer unit content (mol %) was converted to a monomer unit content (wt. %) using the molecular weight of each monomer unit.

(Acid Value)

An obtained glutarimide acrylic resin of 0.3 g was dissolved in a mixed solvent of 37.5 mL of methylene chloride and 37.5 mL of methanol. Two drops of a phenolphthalein ethanol solution were added, and then 5 mL of a 0.1N aqueous sodium hydroxide solution was added. Then, the excess base was titrated with 0.1N hydrochloric acid, and a difference between the amount of the base added and the amount of hydrochloric acid used before neutralization was accomplished expressed in milliequivalent was determined as an acid value.

(Refractive Index)

Each composition was processed into a sheet, and the refractive index (nD) of the sheet was measured at the sodium D-line wavelength in accordance with JIS K7142 using an Abbe refractometer 2T manufactured by ATAGO CO., LTD.

(Glass Transition Temperature)

The temperature of a sample was once increased to 200° C. at a rate of 25° C./min by a differential scanning calorimetry (DSC) SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The film thickness of a film was measured using a digimatic indicator manufactured by Mitutoyo Corporation.

(Formation of Uniaxially-Stretched Film and Measurement of Orientation Birefringence)

A 25 mm×90 mm test specimen was cut out from an unstretched original film having a thickness of 125 μm (so that its longitudinal direction was parallel to MD), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, in-plane phase difference Re and thickness-direction phase difference Rth (incidence angle: 40°) were also measured (measurement of in-plane phase difference Re and thickness-direction phase difference Rth will be described in detail later).

It is to be noted that formation of a uniaxially-stretched film of the polymer (B) itself and measurement of the orientation birefringence of the film were performed in the following manner: only the polymer (B) was pressed at 190° C. to form a pressed plate having a thickness of 500 μm, a 25 mm×90 mm test specimen was cut out from the central portion of the obtained pressed plate, and measurement of orientation birefringence was performed in the same manner as described above.

In the case of the resin (A), an unstretched original film having a thickness of 125 μm was produced in the same manner as in Example 1, and measurement of orientation birefringence was performed in the same manner as described above.

(Orientation Birefringence of Original Film)

A 40 mm×40 mm test specimen was cut out from an unstretched original film (thickness: 125 μm), and the orientation birefringence of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

(In-Plane Phase Difference Re and Thickness-Direction Phase Difference Rth)

A 40 mm×40 mm test specimen was cut out from a film having a thickness of 125 μm, and the in-plane phase difference Re of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic double refraction meter at a wavelength of 590 nm, three-dimensional refractive indexes nx, ny, and nz were determined to calculate a thickness-direction phase difference, Rth=((nx+ny)/2−nz)×d. It is to be noted that the measured value was multiplied by 100 (μm)/film thickness (μm) to be converted to a value per 100 μm thickness, and the thus obtained value is shown in Table 3.

(Photoelastic Constant)

A strip-shaped test specimen of 15 mm×90 mm was cut out (so that its longitudinal direction was parallel to TD) from a film having a thickness of 125 μm. The photoelastic constant of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the photoelastic constant of the polymer (B) itself was measured in the following manner: only the polymer (B) was pressed at 190° C. to prepare a pressed plate having a thickness of 500 μm, a 15 mm×90 mm test specimen was cut out from the central portion of the obtained pressed plate, and the photoelastic constant of the test specimen was measured in the same manner as described above.

In the case of the resin (A), an unstretched original film having a thickness of 125 μm was produced in the same manner as in Example 1, and measurement of photoelastic constant was performed in the same manner as described above.

(Evaluation of Foreign Matter)

Samples having a total area of 1 m$^2$ were cut out from an obtained film, and the total number of foreign substances having a size of 20 μm or more was counted by, for example, observation with a microscope and evaluated according to the following criteria:

◯: less than 100 per m$^2$ x: 100 or more per m$^2$.

(Evaluation of Mechanical Strength)

Mechanical strength was evaluated in terms of trimming property and tensile elongation at breakage as an indicator of crack resistance (tensile elongation: %).

Evaluation of Trimming Property

A film having a thickness of 125 μm was cut using a cutter, and the cut surface of the film was observed to evaluate the trimming property of the film according to the following criteria:

◯: no occurrence of cracking was observed in the cut surface;

Δ: occurrence of cracking was observed in the cut surface; and x: occurrence of cracking was significantly observed in the cut surface.

Tensile Elongation at Breakage

A film having a thickness of 125 μm was used. A tensile test was performed in accordance with ISO527-3 (JIS K 7127) using a type 5 test specimen at a test rate in MD of 200 mm/min, a temperature of 23±2° C., and a humidity of 50±5%.

(Evaluation of Flow Mark)

A film having a width of 300 mm and a length of 2 m was visually observed from a position 20 cm away from the film to confirm the presence or absence of the flow mark according to the following criteria:

◯: There was no flow mark that can be visually confirmed; and x: There were one or more flow marks that can be visually confirmed.

(Evaluation of Die Line)

The number of die lines of a film having a width of 300 mm was confirmed in such a manner that the film was observed by a micro high scope (VHX-2000 produced by Keyence Corporation) in TD. The widths of the die lines were measured, and the sum of the widths was calculated. The results are shown in Table 3.

(Measurement of Relaxation Modulus)

The relaxation modulus was measured by a dynamic viscoelasticity measuring device ARES (produced by TA instruments) under conditions of a set temperature of 260° C., a φ25 mm cone plate, and distortion of 1%. Table 3 shows values measured one second after the start of the relaxation after the application of the distortion.

Production Example 1

<Production of Glutarimide Acrylic Resin (A1)>

A glutarimide acrylic resin (A1) was produced using polymethylmethacrylate as a raw material resin and monomethylamine as an imidization agent.

In Production Example 1, a tandem-type reactive extruder was used, in which two extrusion reactors were connected in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by KUBOTA Corporation).

The pressure in each of the vents of the first and second extruders was reduced to about −0.090 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

After the resin (strand) discharged from the second extruder was cooled on a cooling conveyer and cut into pellets by a pelletizer. In order to adjust the pressure in the part connecting the resin discharge port of the first extruder and the raw material supply port of the second extruder or to detect unstable extrusion, resin pressure meters were provided at the discharge port of the first extruder, the center of the part connecting the first and second extruders, and the discharge port of the second extruder.

In the first extruder, an imide resin intermediate 1 was produced using a polymethylmethacrylate resin (Mw: 105,000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2.

At this time, the temperature of each barrel of the extruder was 260° C., the screw rotation speed of the extruder was 55 rpm, and the amount of dimethyl carbonate added was 3.2 parts per 100 parts of the raw material resin. Further, the esterification agent was removed through a vent, and then an obtained glutarimide acrylic resin (A1) was extruded through a strand die, cooled in a water tank, and pelletized by a pelletizer.

The obtained glutarimide acrylic resin (A1) is an acrylic resin (A) obtained by copolymerization of a glutarimide unit represented by the general formula (1) and a (meth)acrylate unit represented by the general formula (2).

The imidization ratio, glutarimide unit content, acid value, glass transition temperature, and refractive index of the glutarimide acrylic resin (A1) were measured by the above-described methods. As a result, the imidization ratio was 13%, the glutarimide unit content was 7 wt. %, the acid value was 0.4 mmol/g, the glass transition temperature was 130° C., and the refractive index was 1.50. The glutarimide acrylic resin (A1) had a negative photoelastic constant.

Production Example 2

<Production of Graft Copolymer (B1)>

The following materials were fed into a polymerization apparatus having a capacity of 8 liters and equipped with a stirrer.

| Deionized water | 200 parts |
| Sodium polyoxyethylene lauryl ether phosphate | 0.45 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 46.391 parts of a raw material mixture of acrylic rubber particles (B-1) shown in Table 2 was continuously added for 225 minutes. After 50 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added to the polymerization apparatus. After the addition, polymerization was further continued for 0.5 hr to obtain acrylic rubber particles (polymer (B-1)). The polymerization conversion ratio was 99.7%.

Then, the temperature in the polymerization apparatus was adjusted to 60° C., and 0.2 part of sodium formaldehyde sulfoxylate was fed into the polymerization apparatus. Then, 55.554 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B1).

The average particle diameter of rubber particles (polymer B-1) of the graft copolymer (B1) was 73 nm. The graft ratio of the graft copolymer (B1) was 85%.

Production Example 3

<Production of Graft Copolymer (B2)>

The following materials were fed into a polymerization apparatus having a capacity of 8 liters and equipped with a stirrer.

| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.491 parts of a raw material mixture of acrylic rubber particles (B-1) shown in Table 2 was continuously added for 225 minutes. After 20, 40, and 60 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added each time to the polymerization apparatus. After the addition, polymerization was further continued for 0.5 hr to obtain acrylic rubber particles (polymer (B-1)). The polymerization conversion ratio was 98.6%.

Then, the temperature in the polymerization apparatus was adjusted to 60° C., and 0.2 part of sodium formaldehyde sulfoxylate was fed into the polymerization apparatus. Then, 55.554 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B2).

The average particle diameter of rubber particles (polymer B-1) of the graft copolymer (B2) was 121 nm. The graft ratio of the graft copolymer (B2) was 56%.

Production Example 4

<Production of Graft Copolymer (B3)>

Polymerization was performed in the same manner as in Production Example 2 using a raw material mixture of acrylic rubber particles (B-1) with a composition shown in Table 2 and a raw material mixture of a hard polymer layer (B-2) with a composition shown in Table 2. The thus obtained latex was coagulated, washed with water, and dried to obtain a white powder of a graft copolymer (B3).

The average particle diameter of rubber particles (polymer B-1) of the graft copolymer (B3) was 72 nm. The graft ratio of the graft copolymer (B3) was 130%.

Production Example 5

<Production of Graft Copolymer (B4)>

The following materials were fed into a polymerization apparatus having a capacity of 8 liters and equipped with a stirrer.

| Deionized water | 200 parts |
| Sodium dioctylsulfosuccinate | 0.58 part |
| Sodium formaldehyde sulfoxylate | 0.11 part |

| Disodium ethylenediaminetetraacetate | 0.004 part |
|---|---|
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 55.554 parts of a raw material mixture of acrylic rubber particles (B-1) shown in Table 2 was continuously added for 225 minutes. After the addition, polymerization was further continued for 0.5 hr to obtain acrylic rubber particles (polymer (B-1)). The polymerization conversion ratio was 99.7%.

Then, the temperature in the polymerization apparatus was adjusted to 60° C., and 0.2 part of sodium formaldehyde sulfoxylate and 0.2 part of sodium dioctylsulfosuccinate were fed into the polymerization apparatus. Then, 46.391 parts of a raw material mixture of a hard polymer layer (B-2) shown in Table 2 was continuously added for 210 minutes and polymerization was further continued for 1 hour to obtain a graft copolymer latex. The polymerization conversion ratio was 100.0%. The obtained latex was salted out and coagulated with calcium chloride, washed with water, and dried to obtain a white powder of a graft copolymer (B4).

The average particle diameter of rubber particles (polymer B-1) of the graft copolymer (B4) was 72 nm. The graft ratio of the graft copolymer (B4) was 80%.

Production Example 6

<Production of Graft Copolymer (B5)>
The following materials were fed into a polymerization apparatus having a capacity of 8 liters and equipped with a stirrer.

| Deionized water | 200 parts |
|---|---|
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 24, and 36 minutes from the start of the addition of (B-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) was added each time to the polymerization apparatus. After the addition, polymerization was further continued for 0.5 hr to obtain acrylic rubber particles (polymer (B-1)). The polymerization conversion ratio was 99.4%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (B5).

The average particle diameter of rubber particles (polymer B-1) of the graft copolymer (B5) was 133 nm. The graft ratio of the graft copolymer (B5) was 71%.

Production Example 7

<Production of Graft Copolymer (B6)>
The following materials were fed into a polymerization apparatus having a capacity of 8 liters and equipped with a stirrer.

| Deionized water | 200 parts |
|---|---|
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were added to the polymerization apparatus, respectively. After the addition, polymerization was further continued for 1 hr to obtain acrylic rubber particles (polymer (B-1)). The polymerization conversion ratio was 97.8%.

Then, the temperature in the polymerization apparatus was adjusted to 60° C., and 0.11 part of sodium polyoxyethylene lauryl ether phosphate and 0.2 part of sodium formaldehyde sulfoxylate were fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 97.2%. The obtained latex was salted out and coagulated with magnesium sulfate, washed with water, and dried to obtain a white powder of a graft copolymer (B6).

The average particle diameter of rubber particles (polymer B-1) of the graft copolymer (B6) was 117 nm. The graft ratio of the graft copolymer (B6) was 69%.

Production Example 8

<Production of Graft Copolymer (B7)>
The following materials were fed into a polymerization apparatus having a capacity of 8 liters and equipped with a stirrer.

| Deionized water | 200 parts |
|---|---|
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (B-1) shown in Table 2 was continuously added for 135 minutes. After 12, 37, 62, and 87 minutes from the start of the addition of (B-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y) were added to the polymerization apparatus, respectively. After the addition, polymerization was further continued for 1 hr to obtain acrylic rubber particles (polymer (B-1)). The polymerization conversion ratio was 99.0%.

Then, the temperature in the polymerization apparatus was adjusted to 60° C., and 0.11 part of sodium polyoxyethylene lauryl ether phosphate and 0.2 part of sodium formaldehyde sulfoxylate were fed into the polymerization apparatus. Then, 55.254 parts of a raw material mixture of a hard polymer layer (B-2) shown in Table 2 was continuously added for 165 minutes and polymerization was further continued for 1 hour to obtain a graft copolymer latex. The polymerization conversion ratio was 99.4%. The obtained latex was salted out and coagulated with magnesium sulfate, washed with water, and dried to obtain a white powder of a graft copolymer (B7).

The average particle diameter of rubber particles (polymer B-1) of the graft copolymer (B7) was 118 nm. The graft ratio of the graft copolymer (B7) was 85%.

(Description of Resins (A))

A2: Methyl methacrylate-methacrylic acid copolymer Altuglas HT-121 (Arkema Inc.) with a negative (−) photoelastic constant A3: Maleic anhydride-styrene-methyl methacrylate copolymer PLEXIGLAS hw55 (EVONIK INDUSTRIES) with a negative (−) photoelastic constant Examples 1 to 8, Comparative Examples 1 to 3

A mixture of the acrylic resin (A) and the polymer (B) shown in Table 3 was supplied at a rate of 10 kg/hr to a single screw extruder having a full-flight screw with a diameter of 40 mm. The preset temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disk filter with a pore size of 5 μm and connected to a T-die having a width of 350 mm at the outlet thereof and melt-extruded to obtain a film having a thickness shown in Table 3. The preset temperature of temperature control zone of the extruder was 260° C. and the screw rotation speed of the extruder was 20 rpm. Various physical properties of the film were evaluated.

TABLE 2

| | Polymers (B) | B1 | B2 | B3 | B4 | B5 | B6 | B7 |
|---|---|---|---|---|---|---|---|---|
| Acrylic cross-linked polymer layer (acrylic rubber particles) (B-1) | Monofunctional monomer content of (B) (parts) | 45 | 45 | 45 | 55 | 45 | 45 | 45 |
| | Butyl acrylate (%) | 90 | 90 | 90 | 90 | 90 | 90 | 90 |
| | Methyl methacrylate (%) | 10 | 10 | 10 | 10 | 10 | 10 | 10 |
| | Allyl methacrylate (part(s)) | 1.35 | 0.45 | 3 | 1.35 | 0.225 | 0.225 | 0.225 |
| | Cumene hydroperoxide (part) | 0.041 | 0.041 | 0.041 | 0.041 | 0.041 | 0.041 | 0.041 |
| | Volume-average particle diameter of (B-1) (nm) | 73 | 121 | 72 | 72 | 133 | 117 | 118 |
| Hard polymer layer (B-2) | Monofunctional monomer content of (B) (parts) | 55 | 55 | 55 | 45 | 55 | 55 | 55 |
| | Methyl methacrylate (%) | 57.8 | 57.8 | 57.8 | 57.8 | 57.8 | 57.8 | 48 |
| | Butyl acrylate (%) | 4 | 4 | 4 | 4 | 4 | 4 | 4 |
| | Benzyl methacrylate (%) | 38.2 | 38.2 | 38.2 | 38.2 | 38.2 | | |
| | Dicyclopentanyl methacrylate (%) | | | | | | | 48 |
| | Phenoxyethyl methacrylate (%) | | | | | | 38.2 | |
| | t-dodecyl mercaptane (part) | 0.3 | 0.3 | 0.3 | 0.3 | 0 | 0 | 0 |
| | Cumene hydroperoxide (part) | 0.254 | 0.254 | 0.254 | 0.254 | 0.254 | 0.254 | 0.254 |
| Sign of birefringence of polymer (B) itself | Orientation birefringence | + | + | + | − | + | + | − |
| | Photoelastic constant | + | + | + | − | + | + | + |

TABLE 3

|  |  |  | Examples |  |  |  |  |  |  |  | Comparative Examples |  |  |
|---|---|---|---|---|---|---|---|---|---|---|---|---|---|
|  |  |  | 1 | 2 | 3 | 4 | 5 | 6 | 7 | 8 | 1 | 2 | 3 |
| Resin (A) |  | Type | A1 | A1 | A1 | A1 | A1 | A2 | A3 | A3 | A1 | A1 | A1 |
|  |  | (parts) | 53 | 53 | 53 | 53 | 53 | 43.8 | 63.8 | 44.8 | 53 | 53 | 100 |
| Polymers (B) |  | Type | B1 | B2 | B5 | B6 | B7 | B5 | B5 | B5 | B3 | B4 | — |
|  |  | (parts) | 47 | 47 | 47 | 47 | 47 | 56.2 | 36.2 | 55.2 | 47 | 47 | — |
| Film physical properties and appearance | Film thickness | (μm) | 125 | 125 | 125 | 125 | 125 | 125 | 125 | 125 | 125 | 125 | 125 |
|  | Glass transition temperature | (°C.) | 121 | 120 | 121 | 124 | 125 | 129 | 128 | 128 | 123 | 120 | 125 |
|  | Total light transmittance | (%) | 92.4 | 92.1 | 92.1 | 92.0 | 91.5 | 92.2 | 89.9 | 89.9 | 92.2 | 92.3 | 92.4 |
|  | Haze value | (%) | 0.24 | 0.36 | 0.62 | 0.30 | 1.70 | 0.80 | 2.50 | 4.50 | 0.44 | 0.39 | 0.25 |
|  | Mechanical strength / Evaluation of trimming property |  | Δ | ○ | ○ | ○ | ○ | ○ | Δ | ○ | x | ○ | x |
|  | Tensile elongation at breakage | (%) | 45 | 72 | 114 | 76 | 111 | 96 | 49 | 66 | 51 | 51 | 5 |
|  | Flow mark |  | ○ | ○ | ○ | ○ | ○ | ○ | ○ | ○ | ○ | ○ | x |
|  | Foreign matter |  | ○ | ○ | ○ | ○ | ○ | ○ | ○ | ○ | x | x | ○ |
|  | Relaxation modulus | Pa | 1000 | 800 | 650 | 700 | 700 | 670 | 550 | 660 | 2400 | 2550 | 90 |
|  | Die line | μm | 700 | 500 | 390 | 460 | 430 | 390 | 390 | 410 | 2000 | 2320 | 210 |
| Unstretched | Photoelastic constant (×10$^{-12}$) | (Pa$^{-1}$) | 0.02 | 0.35 | −0.09 | 0.31 | −3.69 | 0.34 | −0.37 | 1.56 | 0.55 | −0.35 | −4.38 |
|  | Orientation birefringence (×10$^{-4}$) |  | ±0.04 | −0.13 | ±0.07 | −0.04 | −0.04 | −0.09 | −0.10 | −0.07 | −0.33 | −0.30 | ±0.04 |
|  | Re (per 100 μm) | nm | ±0.4 | −1.3 | ±0.7 | −0.4 | −0.4 | −0.9 | −1.0 | −0.7 | −2.9 | −1.9 | ±0.4 |
|  | Rth (per 100 μm) | nm | −0.4 | −3.1 | −1.6 | 0.3 | −0.5 | −1.7 | −3.0 | −0.3 | −3.9 | −3.9 | −0.9 |
| Stretched twice | Orientation birefringence (×10$^{-4}$) |  | ±0.07 | 0.12 | 0.33 | 0.38 | −0.74 | −0.31 | −1.6 | −0.95 | 0.27 | −0.11 | 0.05 |
|  | Re (per 100 μm) | nm | ±0.7 | 1.2 | 3.3 | 3.8 | −7.4 | −3.1 | −16.6 | −9.5 | 1.9 | 0.8 | 0.5 |
|  | Rth (per 100 μm) | nm | −0.8 | −0.3 | 1.1 | 0.5 | −5.8 | −2.2 | −5.7 | −2.7 | −1.4 | −0.4 | 0.5 |

As shown in Table 3, in Examples 1 to 8, the relaxation modulus falls within a range of 100 to 2,000 Pa, and as a result, the number of die lines is extremely small. Further, the balance of the physical properties of the film in practical use is extremely high.

As shown in Table 3 in detail, Examples 1 and 7 have high heat resistance and high transparency and are also excellent in mechanical strength such as trimming property. Further, the films have low orientation birefringence, and hardly exhibit orientation birefringence even when stretched. In addition, the films have a very small photoelastic constant and hardly exhibit birefringence even when stress is applied thereto. That is, the films have very low optical anisotropy. Further, a resin system having low relaxation modulus tends to have low melt viscosity, and therefore can be filtered with a filter having a small pore size of, for example, 5 μm on molding, which makes it possible to obtain a film having no foreign substances such as fish-eyes. As can be seen from Table 3, Examples 2 to 6 and 8 can also obtain the same excellent effects as Examples 1 and 7 but are superior in mechanical strength to Examples 1 and 7.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method of producing a film, the method comprising:
    melting and kneading a thermoplastic resin composition having a relaxation modulus of not less than 100 Pa and not more than 1500 Pa, the relaxation modulus being measured under conditions of a temperature of 260° C., distortion of 1%, and a relaxation time of 1 second; and
    performing extrusion molding of the thermoplastic resin composition using a T die to form the film,
    wherein the thermoplastic resin composition contains an acrylic resin and a rubber particle.

2. The method according to claim 1, wherein the thermoplastic resin composition contains at least one selected from the group consisting of: a maleimide acrylic resin; a glutarimide acrylic resin; a lactone ring-containing acrylic polymer; a partially-hydrogenated styrene-containing acrylic polymer obtained by partial hydrogenation of an aromatic ring of a styrene-containing acrylic polymer obtained by polymerization of a styrene monomer and another monomer copolymerizable with the styrene monomer; an acrylic polymer containing a cyclic acid anhydride repeating unit; and an acrylic polymer containing a hydroxyl group and/or a carboxyl group.

3. The method according to claim 1, wherein the thermoplastic resin composition contains a maleimide acrylic resin having a maleimide unit represented by a general formula (5) below and a (meth)acrylic ester unit,

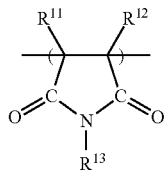

(5)

wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from halogen atom, hydroxyl group, nitro group, alkoxy group having 1 to 12 carbon atoms, alkyl group having 1 to 12 carbon atoms, and arylalkyl group having 7 to 14 carbon atoms.

4. The method according to claim 3, wherein the maleimide acrylic resin further contains a unit represented by a general formula (3) below,

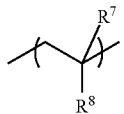

(3)

wherein $R^7$ is hydrogen or an alkyl group having 1 to 8 carbon atoms and $R^8$ is an aryl group having 6 to 10 carbon atoms.

5. The method according to claim 1, wherein the thermoplastic resin composition contains a glutarimide acrylic resin having a unit represented by a general formula (1) below and a unit represented by a general formula (2) below,

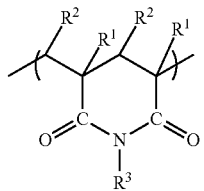

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent group having 5 to 15 carbon atoms,

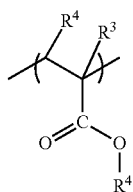

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent group having 5 to 15 carbon atoms.

6. The method according to claim 1, wherein the film is an optical film.

7. The method according to claim 1, wherein die-line formation is suppressed in the film.

8. The method according to claim 1, wherein the relaxation modulus is not more than 1000 Pa.

* * * * *